United States Patent [19]
Yamamuro

[11] Patent Number: 5,488,973
[45] Date of Patent: Feb. 6, 1996

[54] STRUCTURE FOR CONTROL VALVE

[75] Inventor: Shigeaki Yamamuro, Kanagawa, Japan

[73] Assignee: UNISIA JECS Corporation, Kanagawa Prefecture, Japan

[21] Appl. No.: 403,165

[22] Filed: Mar. 13, 1995

Related U.S. Application Data

[62] Division of Ser. No. 155,176, Nov. 19, 1993.

[51] Int. Cl.$^6$ ................................................. F15B 13/044
[52] U.S. Cl. ................................. 137/625.65; 303/119.2
[58] Field of Search ..................... 137/625.65; 303/119.2

[56] References Cited

U.S. PATENT DOCUMENTS

| | | |
|---|---|---|
| 3,129,724 | 4/1964 | Hartwig . |
| 4,396,037 | 8/1983 | Wilcox . |
| 4,513,780 | 4/1985 | Evans . |
| 4,917,150 | 4/1990 | Koch et al. . |
| 4,979,542 | 12/1990 | Mesenich . |
| 5,221,126 | 6/1993 | Inoue . |
| 5,251,671 | 10/1993 | Hiroki . |
| 5,273,348 | 12/1993 | Yagi et al. . |

FOREIGN PATENT DOCUMENTS

| | | |
|---|---|---|
| 63-53156 | 3/1988 | Japan . |
| 3-65461 | 3/1991 | Japan . |
| 3-68685 | 7/1991 | Japan . |

*Primary Examiner*—Gerald A. Michalsky
*Attorney, Agent, or Firm*—Lowe, Price, LeBlanc & Becker

[57] ABSTRACT

A structure for a control valve fluidly disposed between a fluid source and a fluid-pressure operated actuator, comprises a valve housing defining therein an axial bore, a stationary valve member press-fitted into the axial bore and having a portion projected out of the axial bore, a solenoid plunger slidably disposed on an outer periphery of the projected portion of the stationary valve member, a fluid flow regulating valve portion formed on the outer periphery of the projected portion of the stationary valve member and the inner periphery of the plunger, for regulating a flow of working fluid passing therethrough to the actuator, a return spring for biasing the plunger in one axial direction; and an electromagnetic solenoid disposed on an outer periphery of the plunger, for axially sliding the plunger against the bias of the biasing means in response to a control signal.

1 Claim, 15 Drawing Sheets

FIG.3
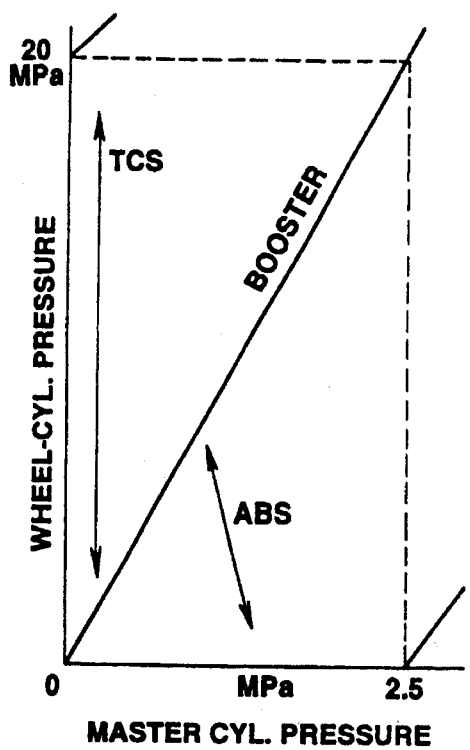
FIG.5
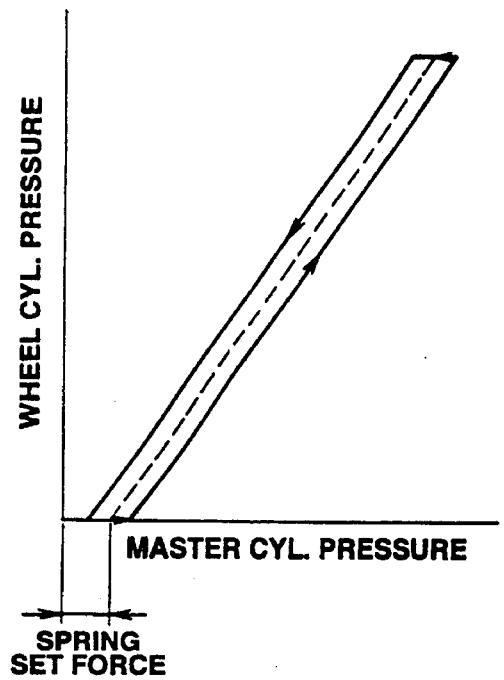
FIG.4A  ABS SOL. ON/OFF
FIG.4B  TCS SOL. ON/OFF

STRUCTURE FOR CONTROL VALVE

This is a divisional of copending U.S. application Ser. No. 08/155,176, filed on Nov. 19, 1993.

BACKGROUND OF THE INVENTION

1. Field of the Invention

The present invention relates to a valve structure for a control valve suitably applied to a fluid pressure control valve which variably controls the outgoing fluid pressure and to a fluid flow control valve which variably controls a rate of the output fluid flow therethrough, and specifically to an electromagnetic solenoid-type fluid pressure control valve which is applied to a hydraulic brake system with an anti-skid brake control system generally abbreviated as an "ABS" and/or a traction control system generally abbreviated as a "TCS", and further to an electromagnetic solenoid type fluid flow control valve which is applied to a steering effort control system for an automotive vehicle in which the steering effort can be suitably controlled depending on the vehicle speed.

2. Description of the Prior Art

Recently, there have been proposed and developed various electromagnetic solenoid type fluid pressure control valves which can properly vary the incoming fluid pressure to generate a controlled fluid pressure to a fluid-pressure operated actuator, such as a vehicle wheel cylinder. For example, Japanese Utility Model First Publication (Jikkai Heisei) No. 3-68685 discloses an electromagnetic solenoid type fluid pressure control valve which includes a valve housing with an axial bore and a substantially cylindrical valve spool slidably enclosed in the axial bore. Such a pressure control valve is usually arranged between an external fluid pressure source and a fluid-pressure operated actuator such as a wheel brake cylinder, so as to suitably control the outgoing fluid pressure therethrough to the actuator. The valve spool itself is integrally formed with a pair of solenoid plunger portions at both ends of the central valve portion of the valve spool. The respective solenoid plungers are arranged axially to the central valve portion in such a manner as to extend in the opposing axial directions of the valve spool. Therefore, the axial length of the valve spool would become large.

Japanese Patent First Publication (Tokkai Showa) No. 3-65461 discloses a brake control system for automotive vehicles, which is applied commonly to an anti-skid brake control and a traction control. The brake control system includes a master-cylinder equipped with a hydraulic brake force booster, four three-port/three-position, electromagnetic solenoid-type switching valves which are included in the ABS and arranged parallel to each other between the master cylinder and the respective wheel cylinders, and two two-port/two-position electromagnetic solenoid-type switching valves which are included in the TCS and arranged in the brake fluid line between the master cylinder and the driven-wheel cylinders. As appreciated from the above, the brake control system disclosed in the Japanese document No. 3-65461 requires a number of electromagnetic solenoid-type switching valves for an anti-skid brake control executed during deceleration slip and a traction control executed during acceleration slip. The above-mentioned plural switching valves are not integrally formed as a single unit, but constructed independently of each other. Thus, the prior art system suffers from the drawback that the entire size and whole weight of the system tend to be both enlarged to provide many advantageous functions, namely a deceleration-slip control, an acceleration-slip control, the functioning of a hydraulic brake booster, or the like. It is troublesome to install the brake control system in a relatively narrow limited space of the vehicle.

SUMMARY OF THE INVENTION

It is, therefore in view of the above disadvantages an object of the present invention to provide a small-sized and lightweight control valve structure in which the axial length of the valve can be limited at a minimum.

It is another object of the invention to provide an improved fluid pressure control valve unit which contributes commonly to an anti-skid brake control system and a traction control system, and is compact to reduce the entire weight and size of the system and to enhance the mounting efficiency of the system.

It is a further object of the invention to provide an improved fluid flow control valve unit which contributes to a steering effort control system for an automotive vehicle and enables the construction of the system to be simplified and the assembly of the system on the vehicle to be facilitated.

In brief, the above objects are achieved by a coaxial arrangement of an electromagnetic solenoid-type control valve constructed as a single valve unit, i.e., by a coaxial arrangement between at least one electromagnetic solenoid, a solenoid plunger serving as a slidable valve spool and a stationary valve member which is stationarily disposed in a valve casing and axially extends along the central axis of the valve. Additionally, the improved fluid pressure control valve includes an axially slidable pilot piston which engages the solenoid plunger at one end thereof and receives a master-cylinder pressure at the other end thereof for moving the plunger in a pressure buildup direction by the received master-cylinder pressure, and an axially slidable reaction piston which receives a controlled fluid pressure at one end thereof and engages the plunger at the other end and is disposed in an axial bore of the stationary valve member for moving the plunger in a pressure reduction direction.

According to one aspect of the invention, a structure for a control valve fluidly disposed between a fluid source and a fluid-pressure operated actuator, comprises a valve housing defining therein an axial bore, a stationary valve member press-fitted into the axial bore and having a portion projected out of the axial bore, a solenoid plunger slidably disposed on an outer periphery of the projected portion of the stationary valve member, a fluid flow regulating valve portion formed on the outer periphery of the projected portion of the stationary valve member and the inner periphery of the plunger, for regulating a flow of working fluid passing therethrough to the actuator, means for biasing the plunger in one axial direction, and an electromagnetic solenoid disposed on an outer periphery of the plunger, for axially sliding the plunger against the bias of the biasing means in response to a control signal.

According to another aspect of the invention, a structure for a control valve fluidly disposed between a fluid source and a fluid-pressure operated actuator, comprises a valve housing defining therein an axial bore, a cylindrical stationary valve member press-fitted into the axial bore and having a portion projected out of the axial bore, a cylindrical solenoid plunger slidably coaxially arranged with the stationary valve member so that an inner peripheral surface of the plunger slidably engages an outer peripheral surface of the projected portion of the stationary valve member, the plunger being cooperative with the stationary valve member to define at least one variable throttling orifice on the two opposing peripheral surfaces, for regulating a flow rate of working fluid flowing through the orifice to the actuator by varying a throttling rate of the orifice depending on an axial position of the plunger to the stationary valve member, a return spring for biasing the plunger in one axial direction, and an electromagnetic solenoid coaxially arranged on an outer periphery of the plunger, for axially sliding the plunger against the bias of the spring in the other axial direction by an axial displacement based on a value of exciting current applied to the solenoid.

According to a further aspect of the invention, a structure for a fluid pressure control valve fluidly disposed between an external fluid pressure source and a fluid-pressure operated actuator and between a fluid reservoir and the actuator, comprises a valve housing defining therein an axial bore, a cylindrical stationary valve member press-fitted into the axial bore and having a portion projected out of the axial bore, a cylindrical solenoid plunger slidably coaxially arranged with the stationary valve member so that an inner peripheral surface of the plunger slidably engages an outer peripheral surface of the projected portion of the stationary valve member, the plunger being cooperative with the stationary valve member to define first and second variable throttling orifices on the two opposing peripheral surfaces, the first orifice fluidly disposed between the external fluid pressure source and the actuator for providing a restricted high-pressure fluid flow to the actuator, and the second orifice fluidly disposed between the reservoir and the actuator for providing a restricted low-pressure fluid flow to the actuator, by varying throttling rates of the first and second orifices such that a throttling rate of one orifice is increased when a throttling rate of the other orifice is decreased depending on an axial position of the plunger to the stationary valve member, a return spring for biasing the plunger in one axial direction, and an electromagnetic solenoid coaxially arranged on an outer periphery of the plunger, for axially sliding the plunger against the bias of the spring in the other axial direction by an axial displacement based on a value of exciting current applied to the solenoid.

According to a still further aspect of the invention, a structure for a fluid flow control valve fluidly disposed between an external fluid pressure source and a fluid-pressure operated actuator, comprises a valve housing defining therein an axial bore, a cylindrical stationary valve member press-fitted into the axial bore and having a portion projected out of the axial bore, a cylindrical solenoid plunger slidably coaxially arranged with the stationary valve member so that an inner peripheral surface of the plunger slidably engages an outer peripheral surface of the projected portion of the stationary valve member, the plunger being cooperative with the stationary valve member to define one variable throttling orifice on the two opposing peripheral surfaces, for regulating a flow rate of working fluid flowing therethrough to the actuator, by varying a throttling rate of the orifice depending on an axial position of the plunger to the stationary valve member, a return spring for biasing the plunger in one axial direction, and an electromagnetic solenoid coaxially arranged on an outer periphery of the plunger, for axially sliding the plunger against the bias of the spring in the other axial direction by an axial displacement based on a value of exciting current applied to the solenoid.

According to another aspect of the invention, a structure for a fluid pressure control valve fluidly disposed between a first fluid pressure source and a fluid-pressure operated actuator and between a fluid reservoir and the actuator, comprises a valve housing defining therein first and second axial bores separated from each other and axially aligned with each other, a cylindrical stationary valve member press-fitted into the first axial bore and having a portion projected out of the first axial bore, a cylindrical solenoid plunger slidably coaxially arranged with the stationary valve member so that an inner peripheral surface of the plunger slidably engages an outer peripheral surface of the projected portion of the stationary valve member, the plunger being cooperative with the stationary valve member to define at least one variable throttling orifice on the two opposing peripheral surfaces, for regulating a fluid pressure of working fluid fed from the first fluid pressure source to the pressure control valve, by varying a throttling rate of the orifice depending on an axial position of the plunger to the stationary valve member, a return spring for biasing the plunger in a pressure reduction direction in which the regulated fluid pressure from the pressure control valve to the actuator is reduced, a reaction piston slidably axially disposed in the projected end of the stationary valve member and receiving the regulated fluid pressure at an innermost end thereof, for and pushing the plunger by an outermost end thereof and for returning the plunger in the pressure reduction direction, and electromagnetic solenoid means coaxially arranged on an outer periphery of the plunger, for axially sliding the plunger in proportion to a value of attraction force based on a value of exciting current applied to the solenoid means. The control valve structure may further comprise a pilot piston slidably accommodated in the second axial bore and receiving a pilot pressure fed from a second fluid pressure source at one end thereof, for pushing the plunger by the other end thereof in a pressure buildup direction in which the regulated fluid pressure is increased. It is preferable that a pressure-receiving area of the pilot piston may be designed to be greater than that of the reaction piston by a predetermined amplification. Alternatively, the cylindrical stationary valve member may be formed with a stepped projected portion, and the plunger may include an annular groove being trapezoidal in cross-section in such a manner as to fit the outer peripheral surface of the stepped valve member, thereby causing the plunger to move in the pressure reduction direction by reaction created by the difference between the pressure-receiving areas of the axially opposing annular side walls defining the singular groove.

BRIEF DESCRIPTION OF THE DRAWINGS

FIG. 3 is a graph illustrating fluid pressure characteristics of the fluid pressure control valve of the first embodiment.

FIGS. 4A and 4B is a timing chart illustrating two waveforms of dither currents applied to a solenoid activated in a phase of an anti-skid brake control and a solenoid activated in a phase of a traction control, respectively.

FIG. 5 is a graph illustrating a fluid pressure characteristic of the fluid pressure control valve of the first embodiment during application of the dither current.

DESCRIPTION OF THE PREFERRED EMBODIMENTS

In a plurality of embodiments, the fluid pressure control valves recited in the first to seventh embodiments respectively incorporating a structure of a control valve according to the invention are exemplified in case of a brake fluid pressure control valve applied to a brake control system incorporated in an automotive brake system, while the fluid flow control valve recited in the eighth and ninth embodiments respectively incorporating a structure of a control valve according to the invention are exemplified in case of a steering effort control system such as an automobile power steering.

First embodiment

Figure 1:
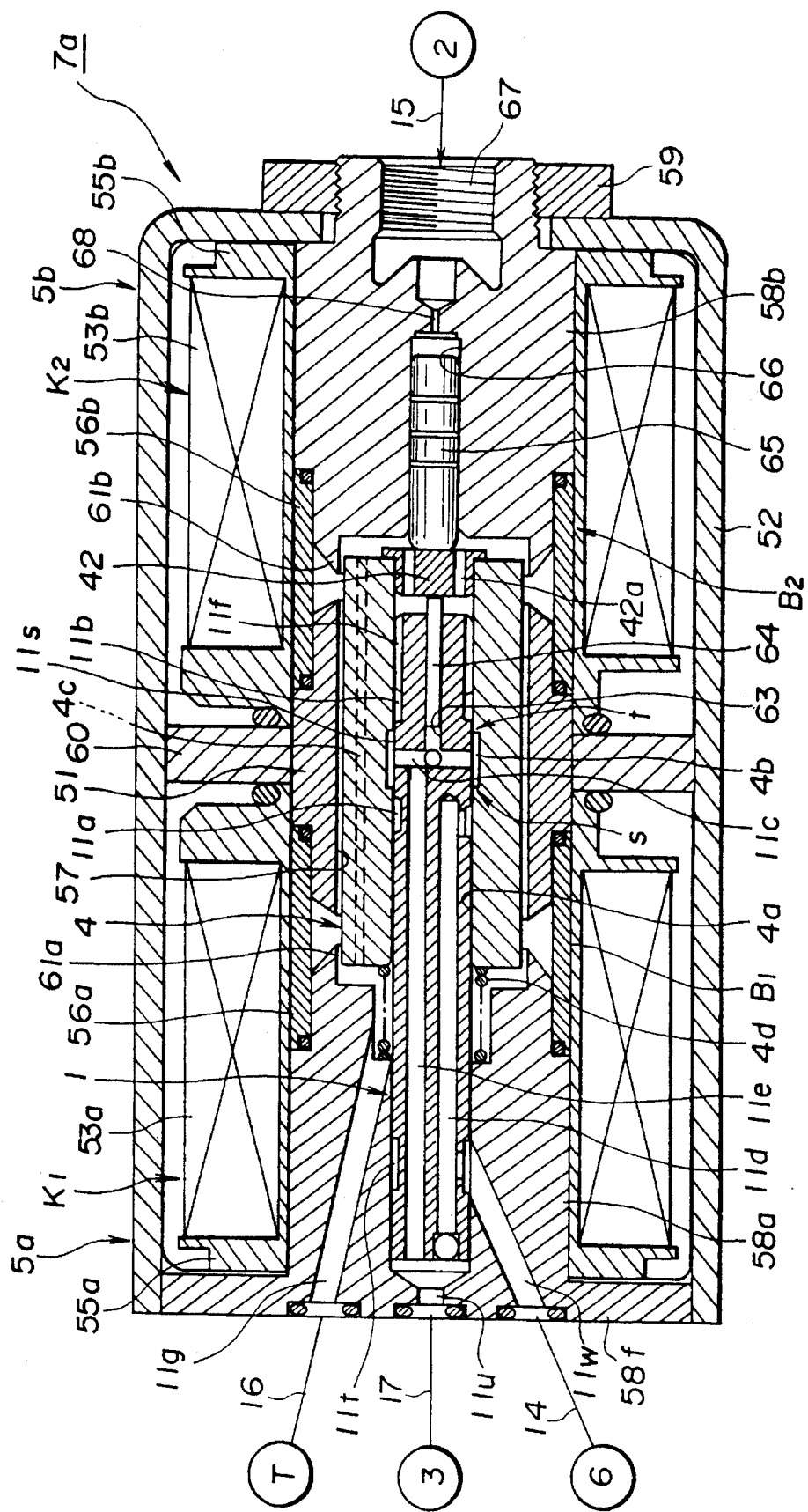
FIG. 1 is an enlarged longitudinal cross-sectional view illustrating a first embodiment of a fluid pressure control valve according to the invention.
Figure 2:
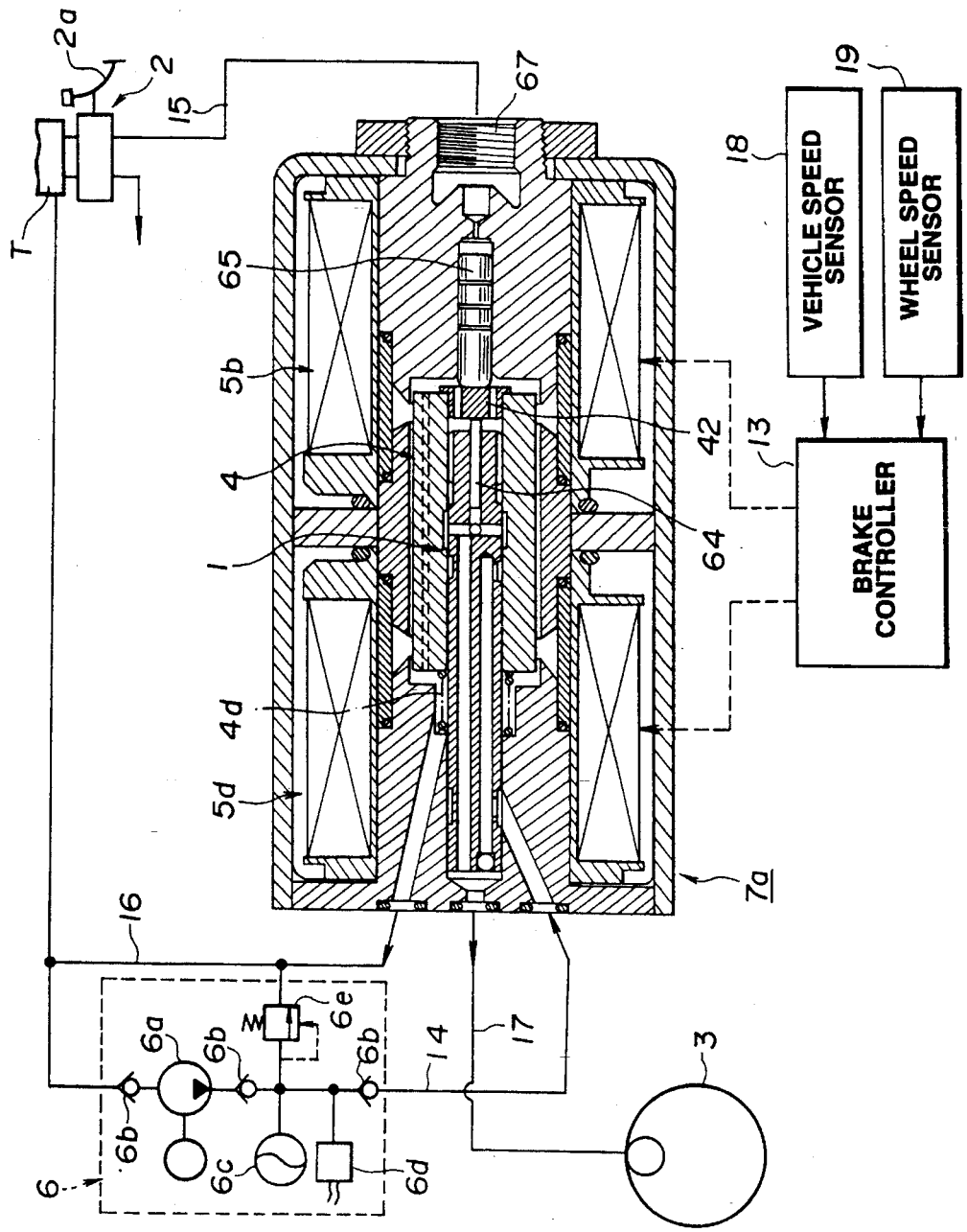
FIG. 2 is a schematic system diagram illustrating a brake fluid pressure control system incorporating the fluid pressure control valve of the first embodiment.

Referring now to FIGS. 1 through 5, particularly to FIG. 2, the brake fluid pressure control system incorporating the fluid pressure control valve of the first embodiment includes a tandem master cylinder 2 connected to a main brake line for producing a master-cylinder pressure depending on the depressing amount of a brake pedal 2a, four wheel brake cylinders 3 respectively attached to rear-left, rear-right, front-left and front-right road wheels, an external brake-fluid pressure source 6, a brake fluid reservoir T, and a brake controller 13. For the purpose of simplification of the disclosure, only one fluid pressure control valve 7a is fluidly disposed in the brake line arranged between the master cylinder 2 and the associated wheel brake cylinder 3. The external fluid pressure source 6 includes a fluid pressure pump 6a, a pair of check valves 6b fluidly disposed just upstream and downstream of the pump 6a, a pressure accumulator 6c temporarily storing a high-pressure brake fluid pressurized by the pump 6a, a pressure switch 6d responsive to a change in the brake-fluid pressure at the outlet port of the accumulator 6c, and a relief valve 6e fluidly connected to the accumulator 6c for relieving excessive pressure discharged from the pump, and an additional check valve 6b disposed downstream of the pressure switch 6d for preventing back-flow from the pressure control valve 7a back to the pressure switch.

Referring now to FIG. 1, the fluid pressure control valve 7a of the first embodiment includes a pair of electromagnetic solenoids 5a and 5b contributing respectively to a traction control and to an anti-skid brake control. The solenoid 5a includes a solenoid body $B_1$ and an exciting coil portion $K_1$, while the solenoid 5b includes a solenoid body $B_2$ and an exciting coil portion $K_2$. The respective solenoids 5a and 5b also include a common coil casing 52 and an axially slidable common solenoid plunger 4. The solenoid plunger 4 which is cylindrical in shape, also serves as a pressure controlling valve spool. The solenoid bodies $B_1$ and $B_2$ consist of a substantially cylindrical common base 51, a pair of intermediate cylindrical members 56a and 56b respectively attached to both ends of the base 51 in a manner so as to be press-fitted onto the outer periphery thereof, and a pair of attracting members 58a and 58b respectively press-fitted into the ends of the intermediate cylindrical members 56a and 56b. The coil portion $K_1$ is comprised of an exciting coil 53a, a bobbin 55a made of non-magnetic material and winding thereon the coil 53a, and the protective coil casing 52, while the coil portion $K_2$ is comprised of an exciting coil 53b, a bobbin 55b made of non-magnetic material and winding thereon the coil 53b, and the coil casing 52. As seen in the left-hand side of FIG. 1, the attracting member 58a includes a flanged portion 58f for receiving the left end of the coil portion $K_1$. Reference numeral 60 denotes an intermediate partition arranged for separating the two solenoids 5a and 5b. The boss-like portion of the left-hand side attracting member 58a, the intermediate cylindrical member 56a, the base 51, the intermediate cylindrical member 56b, and the right-hand side attracting member 58b are cooperative to each other to form a cylindrical solenoid support. When assembling the solenoids, the coil portion $K_1$, the intermediate partition (50, the coil portion $K_2$ are inserted and mounted on the solenoid support in that order, and thereafter the coil casing 52 is abutted with the shoulder portion of the right-hand side attracting member 58b to hermetically cover the outer peripheries of the coil portions and $K_2$ and the partition 60. As seen in the rightmost end of FIG. 1, the attracting member 58b has a male-screw portion. The coil casing 52 is firmly secured onto the shoulder of the attracting member 58b by means of a fastening nut 59 screwed onto the male-screw portion of the latter, In this manner, the coil portions $K_1$ and $K_2$ are detachably mounted on the cylindrical solenoid support so that a damaged coil portion is easily exchangeable for new parts. The thickness of the intermediate partition 60 is restricted to a minimum value necessary to avoid electromagnetic interference between the two solenoid coils $K_1$ and $K_2$, with the result that the two coils $K_1$ and $K_2$ are axially arranged adjacent to each other. The attracting members 58a and 58b, the coil casing 52, the intermediate partition 60, the base 51, and the plunger 4 are respectively made of magnetic material, to provide a path for a magnetic loop. The attracting member 58a is formed with a magnetic leakage edge 61a having a triangle in cross-section, so as to cause the solenoid 5a to produce magnetic attracting force for the plunger 4. Similarly, the attracting member 58b is formed with a magnetic leakage edge 61b having a triangle in cross-section, so as to cause the solenoid 5b to produce magnetic attraction for the plunger As shown in FIG. 1, the base 51 has an axial bore 57 serving as a plunger chamber or a spool chamber in which the solenoid plunger 4 (valve spool) is slidably accommodated. Thai is, the solenoid bodies $B_1$ and $B_2$ both including common base 51 serve as the valve housing for the pressure control valve 7a. The left attracting member 58a has an axial bore into which a substantially left half of a cylindrical shaft-like stationary valve member 1 is press-fitted. The cylindrical plunger 4 has an axial bore 4a through which the plunger 4 is slidably fitted on a substantially right half of the stationary valve member 1. The plunger 4 is made of magnetic material to cause axial sliding movement by attraction caused by the energized solenoid. A substantially cylindrical flanged stopper 42 is press-fitted into the right opening end of the plunger 4 to abut one end of a reaction piston as hereinbelow described in detail. The stopper 42 has at least one communication fluid passageway 42a.

The stationary valve member 1 has a hydraulic pressure supply port 11a and a drain port 11b, each of which consists of an annular groove formed on the outer periphery of the right-half projecting portion of the valve member 1. The supply port 11a is connected to the fluid pressure source 6 through an elongated axial bore 11d in the valve member 1, an annular groove 11t formed on the outer periphery of the valve member 1, an inclined communication passageway 11w formed in the left attracting member 58a and a line 14. The drain port 11b is connected to the reservoir tank T through an axially extending pressure relief groove 11f formed on the outer periphery of the valve member 1, the axial bore 4a facing the stopper 42, the communication passageway 42a, a portion of the plunger chamber 57 facing the right end of the plunger 4, an elongated axial bore 4c formed in the plunger 4, an inclined communication passageway 11g formed in the left attracting member 58a and a line 16. The stationary shaft-like member 1 has a controlled fluid pressure port 11c which is connected to either one of the wheel brake cylinders 3 and arranged midway between the two annular ports 11a and 11b. The controlled fluid pressure port 11c actually consists of a radially extending through opening. The port 11c is connected to the wheel cylinder 3 through an elongated axial communication passageway 11e formed parallel to the axial bore 11d in the valve member 1, an inlet-and-outlet port 11u formed in the left attracting member 58a and a line 17. Thus, atmospheric pressure is introduced into the port 11c. The cylindrical plunger 4 is formed with an annular communication groove 4b in such a manner as to establish a fluid communication between the two ports 11a and 11c or between the to ports 11b and 11c. The communication groove 4b constantly communicates with the controlled fluid pressure port 11c. An intermediate land 11s is defined between the two annular groove-like ports 11a and 11b, in a manner which blocks the respective fluid communications between the ports 11a and 11c and between the ports 11b and 11c, in a centralized neutral position of the plunger 4. As appreciated from FIG. 1 wherein the solenoid plunger 4 is conditioned in its neutral position, the left end of the above-mentioned land 11s is cooperative with the annular communication groove 4b to define a variable throttling orifice s, while the right end of the land is cooperative with the communication groove 4b to define a variable throttling orifice t. In other words, a main fluid pressure regulating valve potion is defined on the radially opposing peripheral surfaces of the valve member 1 and the plunger 4. When the plunger 4 slides on the stationary valve member 1 leftwards (viewing FIG. 1) from the neutral position, the orifice s becomes opened and the orifice t is fully closed such that the opening degree of the orifice s is gradually increased in accordance with an increase in the leftward sliding movement of the plunger 4. Thus, the wheel-cylinder pressure is gradually increased in accordance with the leftward sliding movement of the plunger 4. Conversely, when the plunger 4 slides on the stationary valve member 1 rightwards from the neutral position, the orifice s is fully closed and the orifice t becomes opened such that the opening degree of the orifice t is gradually increased in accordance with an increase in the rightward sliding movement of the plunger 4. In this manner, the controlled fluid pressure created by the fluid pressure control valve 7a is continuously varied depending on a relative displacement of the plunger 4 to its neutral position, in a manner so as to be increased according to the leftward axial movement of the plunger and to be decreased according to the rightward axial movement of the plunger. In any case, since fluid pressure acting on the inner periphery of the plunger 4 is passed through the annular grooves 11a, 4b, or 11b, the fluid pressure acts uniformly on the inner periphery of the plunger 4. Such annular groove arrangement assures a smooth axial sliding movement of the plunger 4 without causing undesirable friction owing to radial force acting on the plunger 4. As appreciated from FIG. 1, it is advantageous to coaxially arrange all of the coil portions $K_1$ and $K_2$, the coil casing 52, the attracting members 58a and 58b, the common base 51, the solenoid plunger 4, and the stationary valve member 1, in order to effectively reduce the whole length of the pressure control valve unit 7a.

A return spring 4d is disposed between the left end of the plunger 4 and the attracting member 58a in its pre-compressed state, with the result that the plunger 4 is normally biased rightwards by way of the bias of the spring 4d. The plunger 4 is thus held in its rightmost position under the de-energized condition of the two solenoids 5a and 5b, with the result that the orifice s is fully opened and therefore atmospheric pressure is introduced through the annular groove 4b into the controlled fluid pressure port 11c. The valve member 1 also includes an axial bore 63 at the projected end. The axial bore 63 is formed to be aligned with the central axis of the valve member 1 and communicates with the port 11e. A parallel-pin type reaction piston 64 is slidably accommodated in the axial bore 63 in such a manner as to receive the controlled fluid pressure at the left end thereof and to push the stopper 42 fatted to the plunger 4 at the other end thereof. A pilot piston 65 is slidably disposed in a central bore defined in the attracting member 58b. A pilot chamber 66 is defined by the eight end surface of the pilot piston 65 and the inner wall of the central bore of the attracting member 58b. With this arrangement of the reaction piston 64, reaction created by abutment between the left end of the stopper 42 and the right end of the reaction piston 64 acts on the plunger 4 to cause a rightward movement of the plunger 4. The pilot chamber 66 is communicated with the outlet port of the master cylinder 2 through a fixed orifice 68, a pilot-pressure inlet port 67 and a line 15. The fixed orifice serves to prevent the sliding movement of the pilot piston 65 from being dampened and to ensure a smooth sliding movement of the piston 65 with a high responsiveness to the pilot pressure. The inlet port 67 receives the master-cylinder pressure as a pilot pressure. With the above arrangement of the pilot piston 65, a leftwardly pushing force transmitted through the pilot piston 65 acts on the plunger 4 through the right end of the stopper 42.

In order to prevent undesirable magnetic field to cause and to enhance magnetizing efficiency of the solenoid, it is preferable that a plurality of parts disposed in the vicinity of the above magnetized members such as the attracting members 58a and 58b, the coil casing 52, the base 51, and the plunger 4 are made of non-magnetic material. In the embodiment, the stationary valve member 1, the stopper 42, the reaction piston 64 and the pilot piston 65 are made of non-magnetic material, such as alumite, stainless steel, or the like.

When the left-hand side solenoid 5a is activated, attracting force created by the solenoid 5a acts to cause a leftward sliding movement of the plunger 4 in the pressure buildup direction wherein the controlled fluid pressure is increased. For this reason, the solenoid 5a is operated during traction control. The left-hand side solenoid 5a is generally referred to as a "TCS solenoid". In contrast to the above, when the right-hand side solenoid 5b is activated, attracting force created by the solenoid 5b acts to cause a rightward sliding movement of the plunger 4 the pressure reduction direction wherein the controlled fluid pressure is reduced. The solenoid 5b is operated during anti-skid control so as to reduce the wheel cylinder pressure. Thus, the fight solenoid is generally referred to as an "ABS solenoid".

As appreciated from FIGS. 4A and 4B, a dither current which oscillates according to a predetermined duty-cycle, is constantly applied to the TCS solenoid 5a and the ABS solenoid 5b, and as a consequence the solenoid plunger 4 slightly oscillates. This micro-vibration prevents undesirable hysteresis of the controlled fluid pressure owing to sliding resistance of the plunger 4 and enhances a responsiveness of the pressure control valve. Upon application of the dither current to the solenoid, the fluid pressure characteristics of a wheel-cylinder pressure versus a master-cylinder pressure exhibits slight positive and negative pressure fluctuations with respect to a usual fluid pressure characteristic shown by the broken line of FIG. 5. As seen in FIGS. 4A and 4B, a dither current applied to the ABS solenoid is conditioned in reverse phase to a dither current applied to the TCS solenoid, in order to suppress undesirable axial displacement of the plunger 4 owing to the dither currents applied to the solenoids 5a and 5b.

Returning to FIG. 2, the brake controller 13 in general includes a TCS control unit and an ABS control unit, so as to drivingly control the TCS solenoid 5a and the ABS solenoid 5b on the basis of detected signals generated by a vehicle speed sensor 18 and a wheel speed sensor 19.

The fluid pressure control valve 7a of the first embodiment operates as follows.

When the brakes are released, i.e., the brake pedal 2a is not depressed, the master-cylinder pressure becomes zero. Under this condition, the plunger 4 of the pressure control valve 7a is held in its rightmost position by the bias of the spring 4d. As a result, the controlled fluid pressure becomes zero, because of the fully opened orifice t. Thus, the wheel-cylinder pressure is held zero.

When the brakes are applied, i.e., the brake pedal 2a is depressed, the master-cylinder pressure is increased in response to an increase in depression of the pedal. During usual braking, the solenoids 5a and 5b are both deactivated, since the ABS and the TCS are held in-operative. In addition, the pump 6a is not driven under the in-operative condition of the TCS. In the pressure control valve 7a, the master-cylinder pressure is applied to the right end of pilot piston 65 through the pilot-pressure inlet port 67, the orifice 68 and the pilot chamber 66. As shown in FIG. 1, the pilot piston 65 is pushed to the left and thus the stopper is pushed to the left by the pilot piston. As a result, the plunger 4 moves leftwards against the bias of spring 4d, and thus the orifice s becomes opened. Thus, the controlled fluid pressure in the port 11c is increased, with the result that a fluid pressure in the fluid-pressure operated actuator, i.e., the wheel cylinder pressure becomes increased. On the other hand, the reaction piston 64 receives the controlled pressure in the port 11c at the left end thereof, with the result that the reaction piston 64 moves rightwards. Owing to the rightward sliding movement of the reaction piston 64, the right end of the reaction piston 64 abuts and pushes the stopper 42. Reaction force of the piston 64 is transmitted through the stopper 42 to the plunger 4, with the result that the plunger 4 is pushed to the right and returns towards the spring set position. As a consequence, the plunger 4 is held in a position at which the leftward pushing force caused by the pilot piston 65 is balanced to the sum of the rightward biasing force created by the spring 4d and the reaction force of the reaction piston 64. Note that a pressure-receiving area of the pilot piston 65 employed in the pressure control vane 7a of the first embodiment is designed to be greater than that of the reaction piston 64. Under the above balanced state, since the product of the controlled fluid pressure in the port 11c and the pressure-receiving area of the reaction piston 64 is in proportion to the product of the master-cylinder pressure and the pressure-receiving area of the pilot piston 65, the ratio of the area of the pilot piston 65 to the area of the reaction piston 64 is necessarily equivalent to the ratio of the controlled fluid pressure in the port 11c to the incoming master-cylinder pressure. Accordingly, as compared with the master-cylinder pressure, the controlled fluid pressure in the port 11c becomes multiplied by a predetermined amplification such as "9". due to the ratio of the pressure-receiving area of the pilot piston 65 to the pressure-receiving area of the reaction piston (54. In such a pressure control valve structure, the wheel-cylinder pressure can be increased with a high pressure gradient in accordance with an increase in the master-cylinder pressure, as appreciated from a wheel-cylinder pressure versus master-cylinder pressure characteristic indicated by BOOSTER of FIG. 3. That is, the pressure control valve itself can function as a compact hydraulic brake force booster. As appreciated from the above, the pressure control valve 7a of the first embodiment can easily produce high braking force.

Alternatively, when the ABS control unit employed in the to brake controller 13 determines skidding of the road wheel owing to excessive braking force exceeding frictional force between the tire and the road surface during quick braking or during braking on a low frictional road, for example wet, snow or icy roads, the ABS is put into operation. During operation of the ABS, the ABS controls the magnitude of the exciting current applied to the ABS solenoid 5b, depending on the slip rate of each road wheel. The slip rate is usually derived by the ABS control unit on the basis of the detected vehicle speed and the detected wheel speed. On the other hand, the TCS is held in-operative, the pump 6a is not driven and as a result only the master-cylinder pressure is introduced to the pressure control valve 7a. The ABS operates to permit normal application of the brakes by alternately reducing and intensifying the wheel-cylinder pressure of the skidding road wheel, such that braking can be held just below the point at which a skid would start to develop. Upon the ABS solenoid 5b is energized during operation of the ABS, the exciting coil 53b produces a magnetic loop in cooperation with the attracting member 58b, the coil casing 52, the intermediate partition 60, the common base 51 and the plunger 4, with the result that the triangular magnetic leakage edge 61b generates attracting force to attract the plunger 4 towards the right side. As a consequence, the plunger 4 is moved rightwards by way of activation of the ABS solenoid 5b. The valve spool becomes kept in a position wherein the leftward pushing force caused by the pilot piston 65 is balanced to the sum of the rightward biasing force of the spring 4d, the reaction of the reaction piston 64, and the attraction created by the ABS solenoid 5b. In this manner, the plunger 4 is slightly returned to the right side owing to the attraction of the solenoid 5b, and thus the controlled fluid pressure is decreased to reduce braking force applied to the skidding road wheel. This prevents a skid of the road wheel. The brake controller 13 properly increases and decreases the magnitude of the exciting current applied to the ABS solenoid 5b on the basis of comparison of the detected slip rate with a predetermined allowable slip rate. As shown in FIG. 3, a wheel-cylinder pressure versus master-cylinder pressure characteristic can be varied within a controlled pressure range indicated by ABS.

When the vehicle experiences acceleration slip of the driven wheels owing to excessive driving force above friction between the road surface and the driven wheels during quick depression of the accelerator pedal, such as quick starting, quick acceleration, or the like, the TCS comes into operation so as to suppress excessive driving force exerted on the driven wheels and to enhance a controllability of the vehicle. During operation of the TCS, the TCS is responsive to the slip rate of each driven wheel to control the magnitude of the exciting current applied to the TCS solenoid 5a employed in the pressure control valve 7a. On the other hand, since the pump 6a of the external fluid pressure source 6 is driven in response to the instruction from the TCS, the pressurized fluid is introduced into the fluid-pressure supply port 11a. Upon activation of the TCS solenoid 5a, the exciting coil 53a is cooperative to the attracting member 58a, the coil casing 52, the intermediate partition 60, the common base 51 and the plunger 4, so as to produce a desired magnetic loop. The triangular magnetic leakage edge 61a generates the attraction to attract the plunger 4 towards the left side. As a consequence, the plunger 4 is moved leftwards by way of activation of the TCS solenoid 5a. The plunger 4 becomes kept in a position wherein the attraction created by the TCS solenoid 5a is balanced to the sum of the rightward biasing force of the spring 4d and the reaction of the reaction piston 64. In this manner, the valve spool 4 is slightly returned to the left side owing to the attraction of the TCS solenoid 5a, and thus the pressurized fluid is fed through the port 11a to the port 11c. As a result, the controlled fluid pressure is increased to build up braking force applied to the slipping road wheel. This reduces an acceleration-slip of the road wheel, The brake controller 13 properly controls the magnitude of the exciting current applied to the TCS solenoid 5a on the basis of comparison of the detected slip rate with a predetermined allowable slip rate. As shown in FIG. 3, a wheel-cylinder pressure versus master-cylinder pressure characteristic can be varied within a controlled pressure range indicated by TCS.

As will be appreciated from the above, in the pressure control valve 7a of the first embodiment, since the valve spool 4 itself is formed as a common solenoid plunger applied commonly to both the TCS solenoid 5a and the ABS solenoid 5b and additionally the two solenoids 5a and 5b are axially arranged adjacent to each other, the axial length of the valve unit 7a is effectively shortened. Thus, the whole weight of the valve unit 7a is also reduced, thereby enhancing the mounting efficiency of the valve unit 7a on the vehicle. The pressure control valve of the first embodiment is Constructed as a single valve unit having a hydraulic brake force booster function as well as the ABS-valve function and the TCS-valve function, such a valve structure ensures a light-weight brake fluid pressure control system. Furthermore, since the solenoid plunger 4, the reaction piston 64, and the pilot piston 65 are axially aligned with each other along the central axis of the solenoids 5a and 5b, the pressure-sensing parts such as the solenoid plunger, the reaction piston and the pilot piston can be compactly arranged in the cylindrical hollow defined in the solenoids, while preventing undesirable magnetic field to cause and enhancing magnetizing efficiency of the solenoids.

Second embodiment

Figure 6:
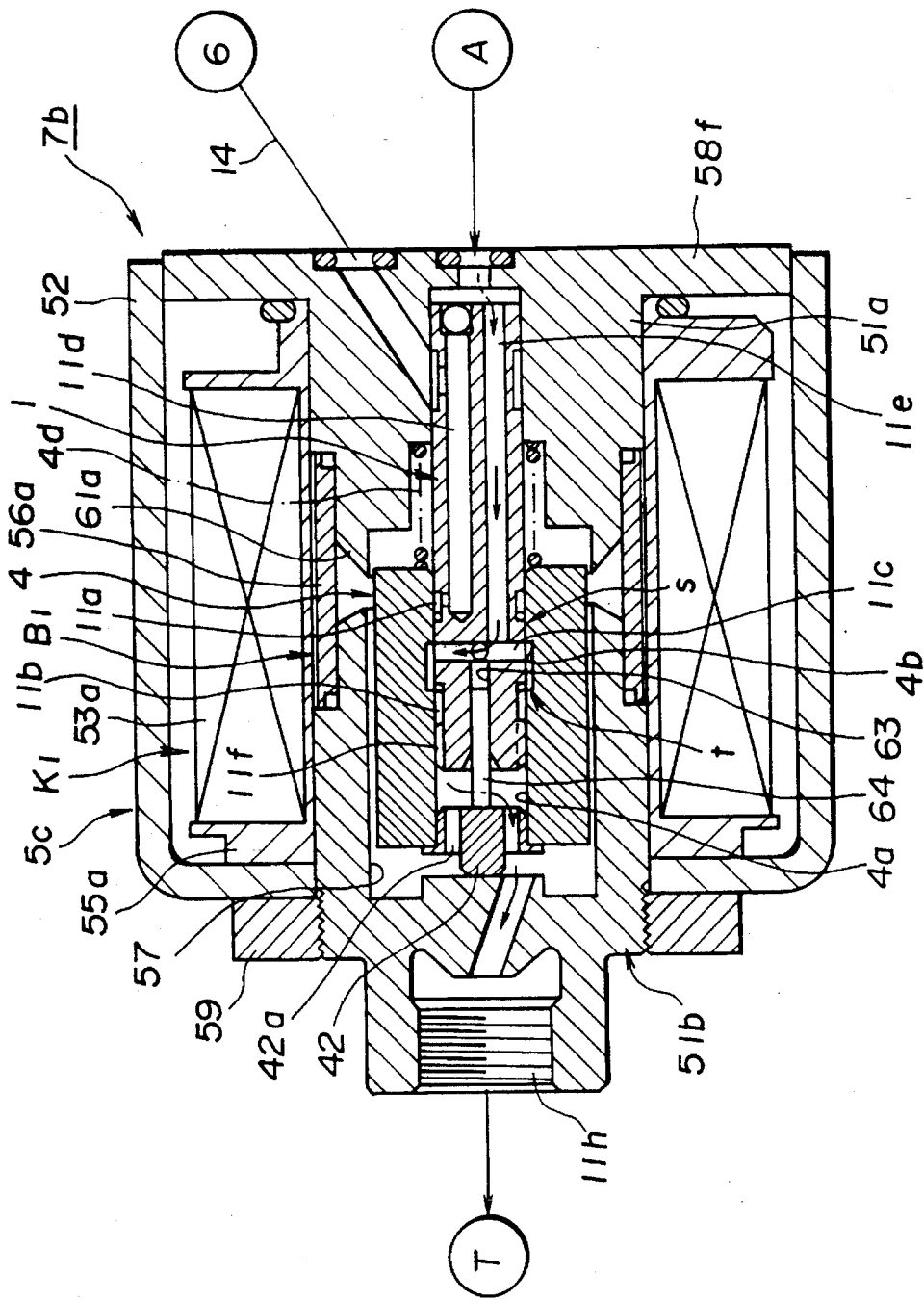
FIG. 6 is an enlarged longitudinal cross-sectional view illustrating a second embodiment of the fluid pressure control valve in which the solenoid is de-activated.
Figure 7:
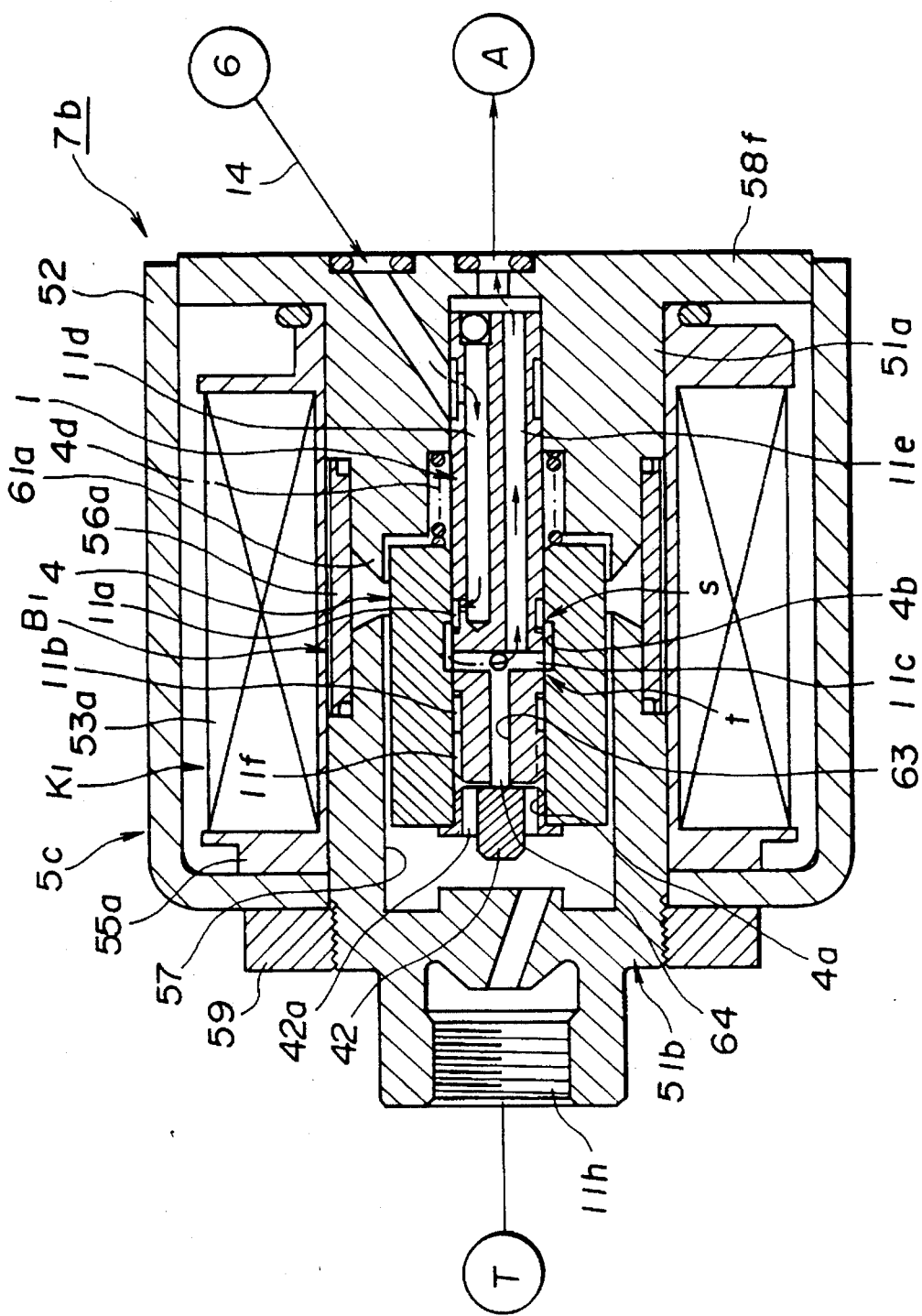
FIG. 7 is an enlarged cross-sectional view illustrating the pressure control valve of the second embodiment in the solenoid-activated state.

Referring now to FIGS. 6 and 7, there is shown the second embodiment of the fluid pressure control valve applied to a brake fluid pressure control system. The, basic pressure control valve structure of the second embodiment as shown in FIGS. 6 and 7 is similar to that of the first embodiment as shown in FIGS. 1 through 5. Therefore, the same reference numerals used in the first embodiment will be applied to the corresponding elements used in the second embodiment of FIG. 6, for the purpose of lo comparison between the first and second embodiments, Furthermore, the same reference numerals as the first and second embodiments will be applied to the third through ninth embodiments hereinafter described in detail, for the purpose of simplification of the disclosure.

Referring now to FIGS. 6 and 7, the fluid pressure control valve 7b of the second embodiment is different from the fluid pressure control valve of the first embodiment in that only a TCS solenoid 3c is provided and parts corresponding to an ABS solenoid and a pilot piston are not provided. Therefore, in the second embodiment, the attracting member 58a of the first embodiment is replaced with a base 51a. The base 51 and the attracting member 58b of the first embodiment are replaced by only one part, namely an base 51b. The base 51b has a communication drain port 11b at the outside end thereof. The drain port 11h is connected to the reservoir tank T. The drain port 11b is connected through the pressure relief groove 11f and the communication passageway 42a, and the drain port 11b to the reservoir tank T. The controlled fluid pressure port 11c is connected through the axial communication passageway 11e to the fluid-pressure operated actuator A, such as a wheel brake cylinder. The fluid pressure control valve 7b of the second embodiment operates as follows.

Under the de-energized condition of the solenoid 5c, the plunger 4 is maintained in the leftmost position by way of the bias; of the spring 4d, as shown in FIG. 6. As a result, the orifice s is fully closed and the orifice t is opened, and thus the fluid pressure in the actuator A is released to the tank T. Consequently, the fluid pressure in the actuator A becomes reduced. In contrast to the above, upon the solenoid 5c is energized, the plunger 4 moves rightwards against the bias of the spring 4d by way of attracting force of the solenoid 5c, with the result that the orifice t is fully closed and the orifice s becomes opened, as shown in FIG. 7. As a result, the pressurized fluid is fed from the external fluid pressure source 6 through the axial bore 11d, the supply port 11a to the annular communication groove 4b and the controlled fluid pressure port 11c to the actuator A. As a consequence, the fluid pressure in the actuator A is increased. As appreciated from the above, in the fluid pressure control valve 7b of the second embodiment, since the stationary valve member 1 and the cylindrical valve spool 4 serving as the solenoid plunger are coaxially arranged with each other, the entire axial length of the valve 7b can be shortened. In addition to the above, since the solenoid plunger 4 also serves as the valve spool, the number of parts is reduced. This ensures lightening of the valve unit.

Third embodiment

Figure 8:
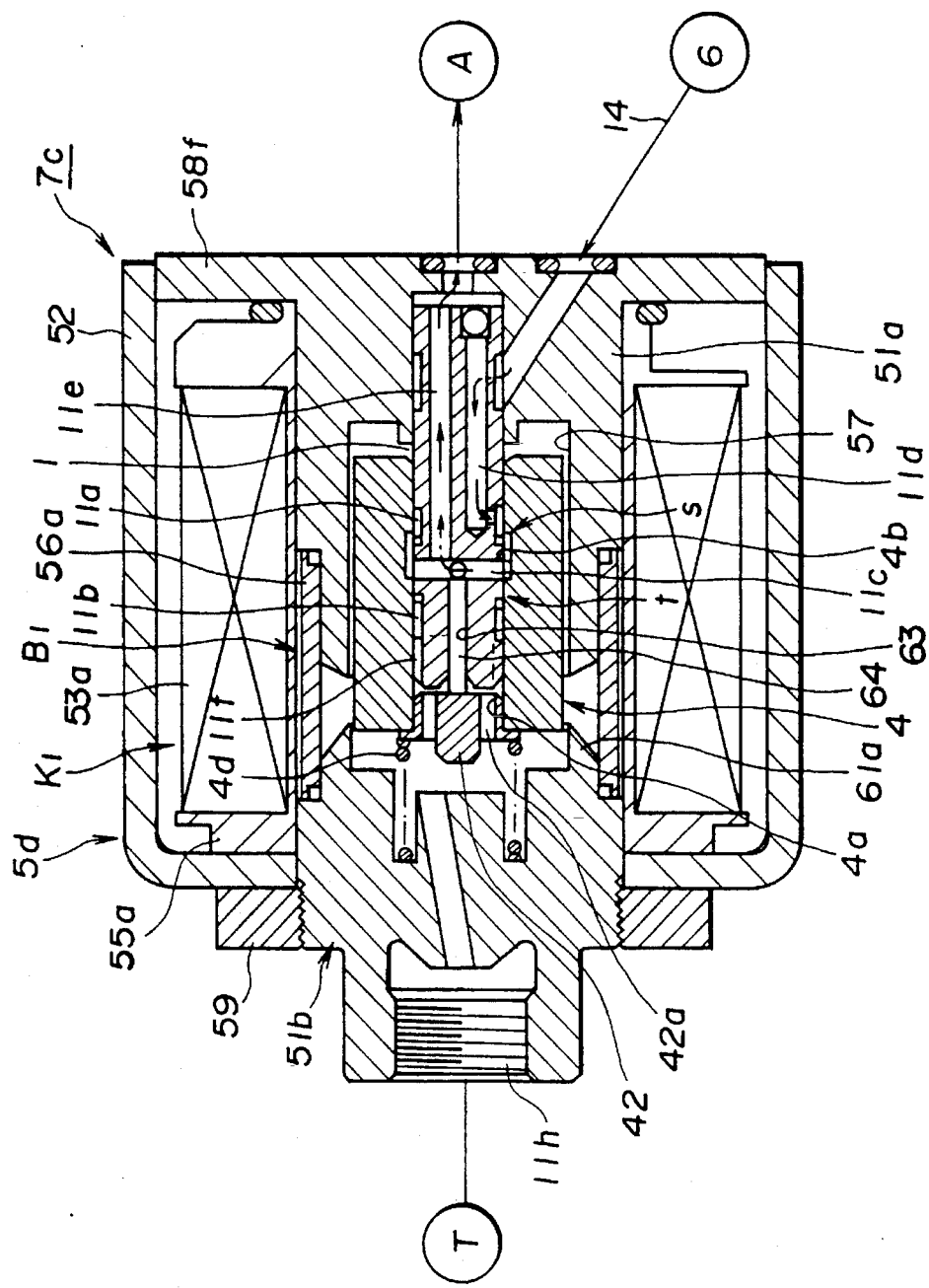
FIG. 8 is an enlarged longitudinal cross-sectional view illustrating a third embodiment of the pressure control valve in the solenoid-deactivated state.
Figure 9:
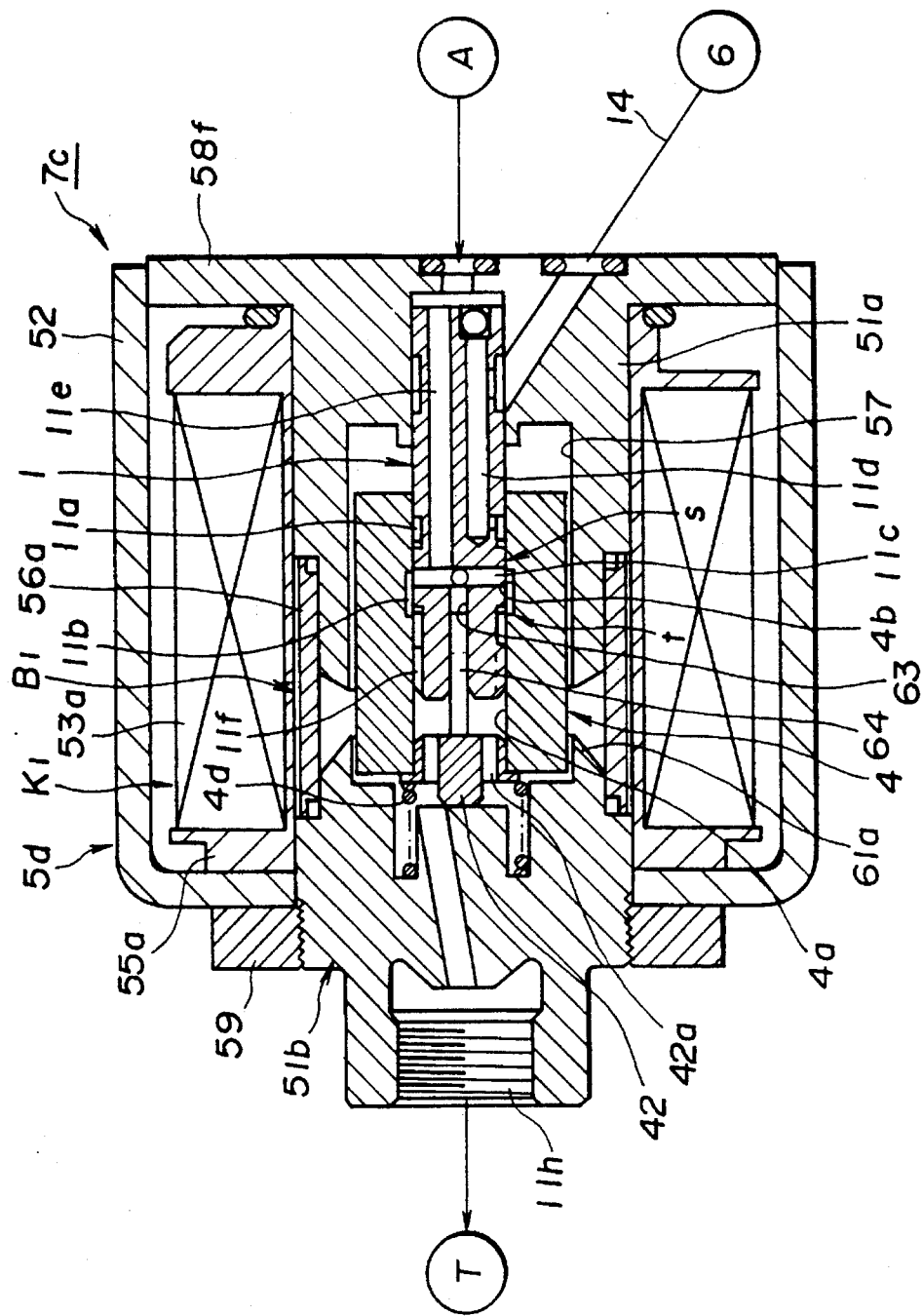
FIG. 9 is an enlarged cross-sectional view illustrating the pressure control valve of the third embodiment in the solenoid-activated state.

Referring now to FIGS. 8 and 9, there is shown a fluid pressure control valve 7c of the third embodiment. The structure of the pressure control valve 7c of the third embodiment is basically similar to that of the second embodiment. The valve structure of the third embodiment is different from that of the second embodiment in that the triangular magnetic leakage edge 61a is formed at the base 51b but not at the base 51a. Thus, in contrast to the pressure control valve 7b of the second embodiment, when the solenoid 5d employed in the pressure control valve 7c of the third embodiment is conditioned in its de-energized state, the plunger 4 is maintained in its rightmost position by the bias of the spring 4d, with the result that the orifice s is opened and therefore the fluid pressure in the actuator A becomes increased. On the other hand, when the solenoid 5d is energized, the plunger 4 is moved leftwards against the spring biasing force by way of attraction of the solenoid 5d. As a result, the orifice t becomes opened and thus the fluid pressure in the actuator A is released to the reservoir T. As set forth above, the pressure control valve 7c of the third embodiment has the same effect as the pressure control valve 7b of the second embodiment.

Fourth embodiment

Figure 10:
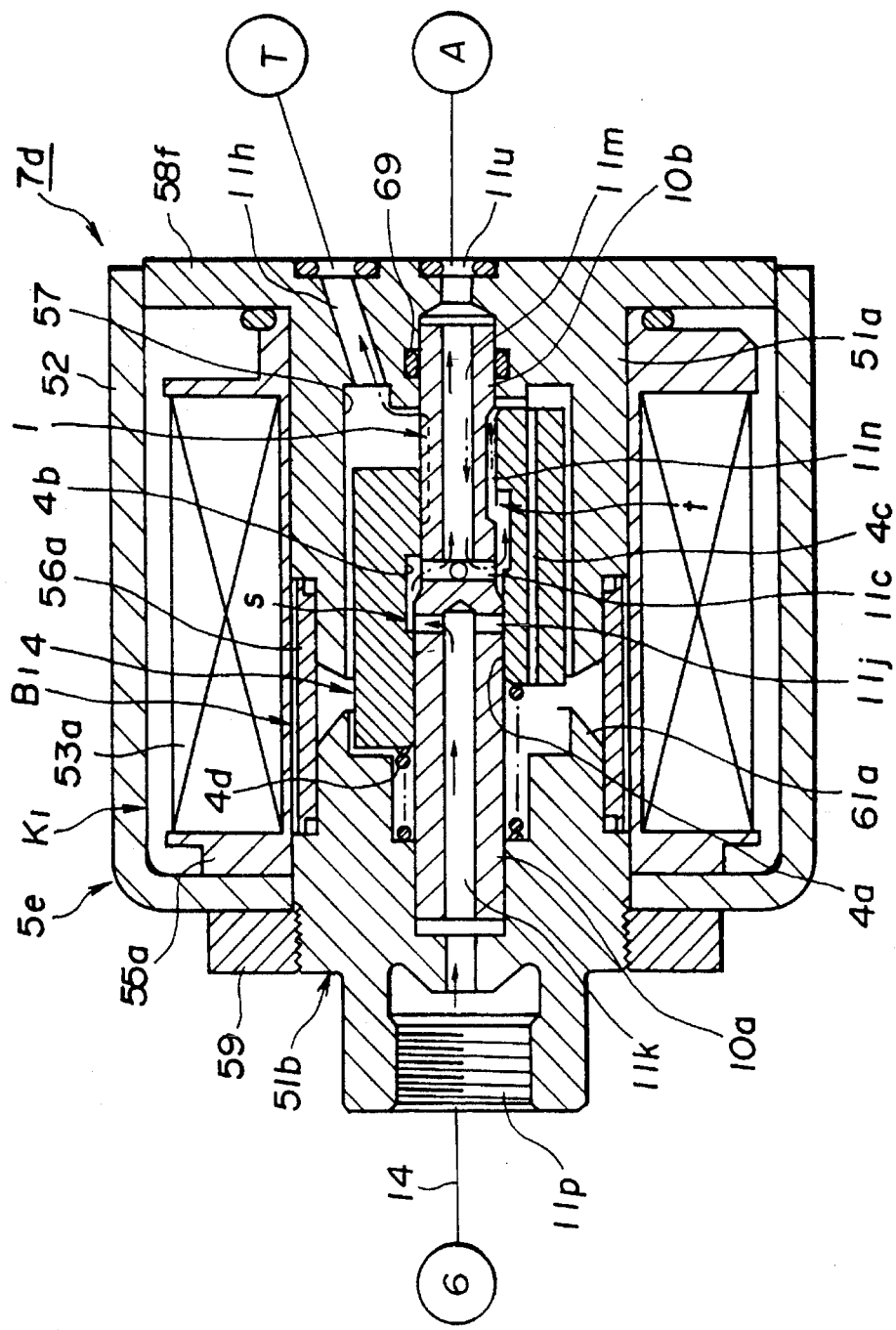
FIG. 10 is an enlarged longitudinal cross-sectional view illustrating a fourth embodiment of the pressure control valve, wherein upper and lower halves respectively showing one valve condition in the solenoid-activated state and the other valve condition in the solenoid-deactivated state.

Referring now to FIG. 10, there is shown a fluid pressure control valve 7d of the fourth embodiment. The upper half of the valve 7d illustrated above the one-dotted center line of FIG. 10 shows a valve spool position under the energized condition of the solenoid 5c, while the lower half of the valve 7d illustrated below the center line shows a spring set position of the valve spool 4 under the de-energized condition of the solenoid 5e. The pressure control valve of the fourth embodiment is different from that of the third embodiment in that the structure of the stationary valve member 1 and the fluid passageways of respective parts 1 and 4 are different from those of the third embodiment. In the fourth embodiment, the stationary valve member 1 is a stepped shaft consisting of a left-hand side large-diameter portion 10a and a right-hand side small-diameter portion 10b. The left end of the large-diameter portion 10a is press-fitted into the axial bore of the attracting base 51b. The right end of the small-diameter portion 10b is fitted into the axial bore of the base 51a in a fluid-tight fashion by means of a seal ring 69 such as an O ring disposed between the outer periphery of the small-diameter portion 10b and the inner peripheral wall of the axial bole of the base 51a. The large-diameter portion 10a includes a radially extending pressure supply port 11j adjacent to the stepped portion of the valve member 1 and an axial bore 11k, while the small-diameter portion 10b includes a radially extending controlled fluid pressure port 11c adjacent to the stepped portion, an axially extending pressure supply bore 11m, and an axially extending pressure relief groove 11n formed on the outer periphery thereof. The axial bore 11k extends along the central axis of the stationary valve member 1 to intercommunicate the radial bore 11j and an external fluid pressure port lip formed in the base 51b. The axial bore 11m extends along the central axis of the stationary valve member 1 to intercommunicate the controlled fluid pressure port 11c and the inlet-and-outlet port 11u leading to the actuator A. The base 51a is formed with an inclined communication drain port or passageway 11h. The axial groove 11n is connected through the inclined drain port 11b to the reservoir T. The plunger 4 has a stepped bore 4a in such a manner as to slide along the stepped outer periphery of the stationary valve member 1. A substantially annular communication groove 4b being a trapezium in cross-section is formed at the stepped section of the stepped bore 4a of the plunger 4, such that the groove 4b constantly communicates with the controlled fluid pressure port 11c. The annular groove 4b is cooperative to the supply port 11j to define a variable throttling orifice s and is cooperative to the pressure relief groove 11n to define a variable throttling orifice t. As seen in FIG. 10, the communication groove 4b is defined by a circumferentially extending cylindrical bottom wall surface, a right-hand side radially extending annular wall surface, and a left-hand side radially extending annular wall surface which has the width less than the right-hand side annular surface and opposes axially to the right-hand side annular surface. In the annular groove structure of the valve of the fourth embodiment, the plunger 4 (valve spool) tends to be moved to the fight (viewing in FIG. 10) by way of reaction created by the difference of the pressure receiving areas between the two opposing annular wall surfaces of the groove 4b. Actually, the width difference between the two opposing annular walls corresponds to the difference between the outside diameters of the two portions 10a and 10b. That is to say, the plunger 4 with the trapezoidal annular groove 4b operates as if the plunger itself serves as a reaction piston.

As shown in the lower half of FIG. 10, under the deenergized condition of the solenoid 5e, the plunger 4 is biased to the rightmost position by the bias of the spring 4d, with the result that the orifice s is fully closed and the orifice t is opened. Thus, the working fluid in the actuator A is exhausted to the reservoir T through the port flu, the axial bore 11m, the port 11c, the annular groove 4b, the pressure relief groove 11n, and the inclined communication drain port 11b. The fluid pressure in the actuator A is reduced, in the in-operative state of the solenoid 5e. Conversely, as seen in the upper half of FIG. 10 in which the solenoid 5e is energized, the plunger 4 is moved to the leftmost position against the bias of the spring 4d by way of attraction of the solenoid 5e. As a consequence, the orifice t is fully closed and the orifice s becomes opened and thus external fluid pressure generated by the fluid pressure source 6 is transmitted to the actuator A through the line 14, the external fluid pressure port 11p, the axial bore 11k, the supply port 11j, the annular communication groove 4b, the port 11c, the axial bore 11m, and the inlet-and-outlet port 11u. Thus, the fluid pressure in the actuator A tends to be intensified. In this case, the two opposing pressure-receiving annular surfaces of the groove 4b receive the controlled fluid pressure fed to the actuator A, and thus reaction created by the difference between the two pressure-receiving areas is also increased in accordance with an increase in the controlled fluid pressure. According to the increase in the reaction, the plunger 4 is again returned to the right. Finally, the plunger 4 becomes kept in a position wherein the attraction of the solenoid 5e is balanced to the sum of the rightward biasing force of the spring 4d and the above-noted reaction, Accordingly, the plunger 4 is slightly returned to the right side owing to the reaction created by the two opposing pressure-receiving surfaces of the groove 4b. In this manner, the controlled fluid pressure can be controlled to a pressure value proportional to a value of the exciting current applied to the solenoid 5e. As sot forth above, in the pressure control valve 7d of the fourth embodiment, since the stationary valve member 1 and the solenoid plunger 4 are arranged coaxially to each other, the entire axial length can be shortened, Although the stationary valve member 1 defines therein the two parallel axial bores lid and 11e in the pressure control valves 7a, 7b and 7c of the first, second, and third embodiments, the stationary valve member 1 of the fourth embodiment includes the two axial bores 11k and 11m axially aligned to each other and separated from each other. Therefore, the outside diameter of the valve member 1 of the fourth embodiment can be small-sized as compared with the first to third embodiments. In addition to the above, since the plunger 4 of the fourth embodiment also serves as a reaction piston without providing the stopper 42 and the reaction piston 64, the number of parts of the valve unit can be minimized. In view of the foregoing, the structure of the pressure control valve 7d of the fourth embodiment is superior to those of the first to third embodiments.

Fifth embodiment

Figure 11:
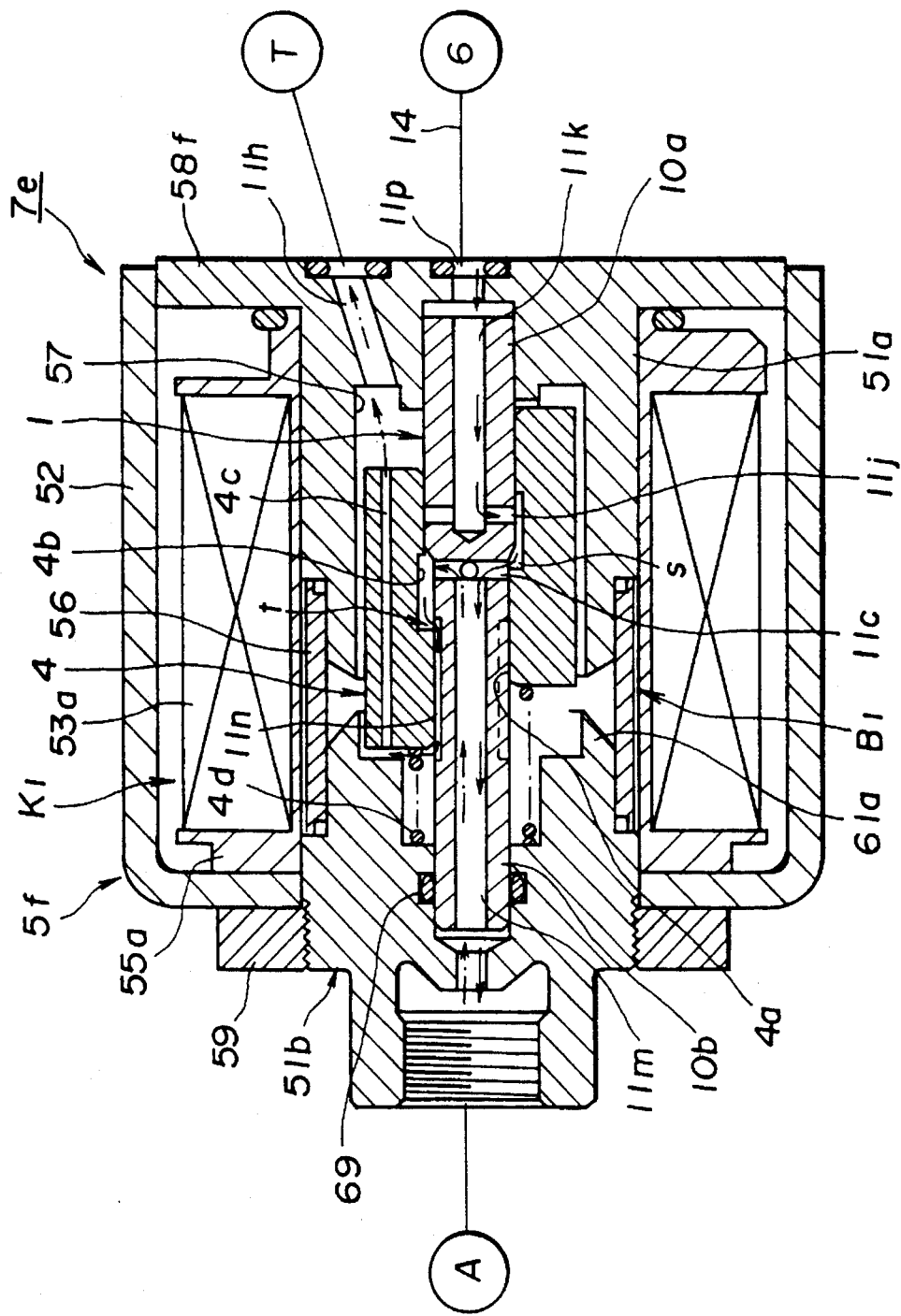
FIG. 11 is an enlarged longitudinal cross-sectional view illustrating a fifth embodiment of the pressure control valve, wherein upper and lower halves respectively showing one valve condition in the solenoid-activated state and the other valve condition in the solenoid-deactivated state.

Referring now to FIG. 11, the upper half of FIG. 11 shows the energized condition of the solenoid 5f employed in the pressure control valve 7e of the fifth embodiment, while the lower half of FIG. 11 shows the de-energized condition of the solenoid 5f. The structure of the pressure control valve 7e of the fifth embodiment is basically similar to the pressure control valve 7d of the fourth embodiment. As compared with the structure of the control valve 7d of the fourth embodiment, the stationary valve member 1 and the plunger 4 both arranged in the valve 7e of the fifth embodiment are reversed in the opposite axial direction. For these reasons, the two junctions between the actuator A and the valve 7e and between the external fluid pressure source 6 and the valve 7e are replaced with each other. Under the energized condition of the solenoid 5f, the fluid pressure in the actuator A is reduced. Under the de-energized condition, the fluid pressure in the actuator A is intensified. Accordingly, the valve 7e of the fifth embodiment has the same effect as the valve 7d of the fourth embodiment.

Sixth embodiment

Figure 12:
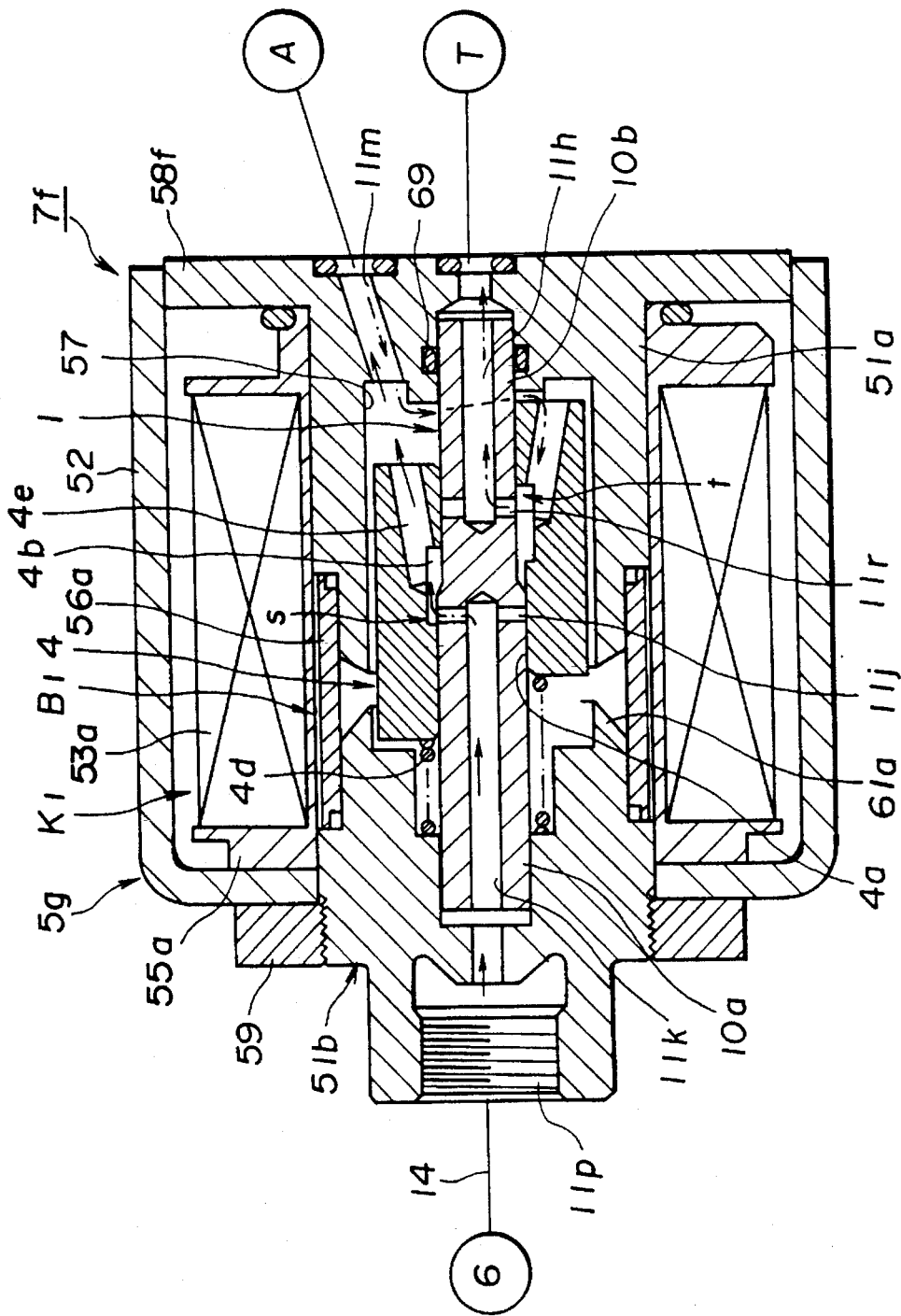
FIG. 12 is an enlarged longitudinal cross-sectional view illustrating a sixth embodiment of the pressure control valve, wherein upper and lower halves respectively showing one valve condition in the solenoid-activated state and the other valve condition in the solenoid-deactivated state.

Referring now to FIG. 12, the upper half of FIG. 12 shows the energized condition of the solenoid 5g employed in the pressure control valve 7f of the sixth embodiment, while the lower half of FIG. 12 shows the de-energized condition of the solenoid 5g. The structure of the pressure control valve 7f of the sixth embodiment is basically similar to the pressure control valve 7d of the fourth embodiment, but the fluid passageway structure of the control valve 7f of the sixth embodiment is different from that of the control valve 7d of the fourth embodiment. As compared with the passageway structure of the control valve 7d of the fourth embodiment, the pressure relief groove 11n of the valve 7d is replaced with an inclined pressure supply passageway 4e which intercommunicates the annular communication groove 4b and the plunger chamber 57. In the sixth embodiment, the inclined drain port 11h of the control valve 7d is replaced with an axially extending drain bore of the control valve 7f, while the axial pressure supply bore 11m of the control valve 7d is replaced with an inclined pressure supply port or passageway of the control valve 7f. In the above-noted passageway structure of the valve 7f of the sixth embodiment, the controlled fluid pressure port 11c is thus replaced with a drain port 11r. As appreciated from the above, the pressure control valve of the sixth embodiment has the same effect as the valve 7d of the fourth embodiment.

Seventh embodiment

Figure 13:
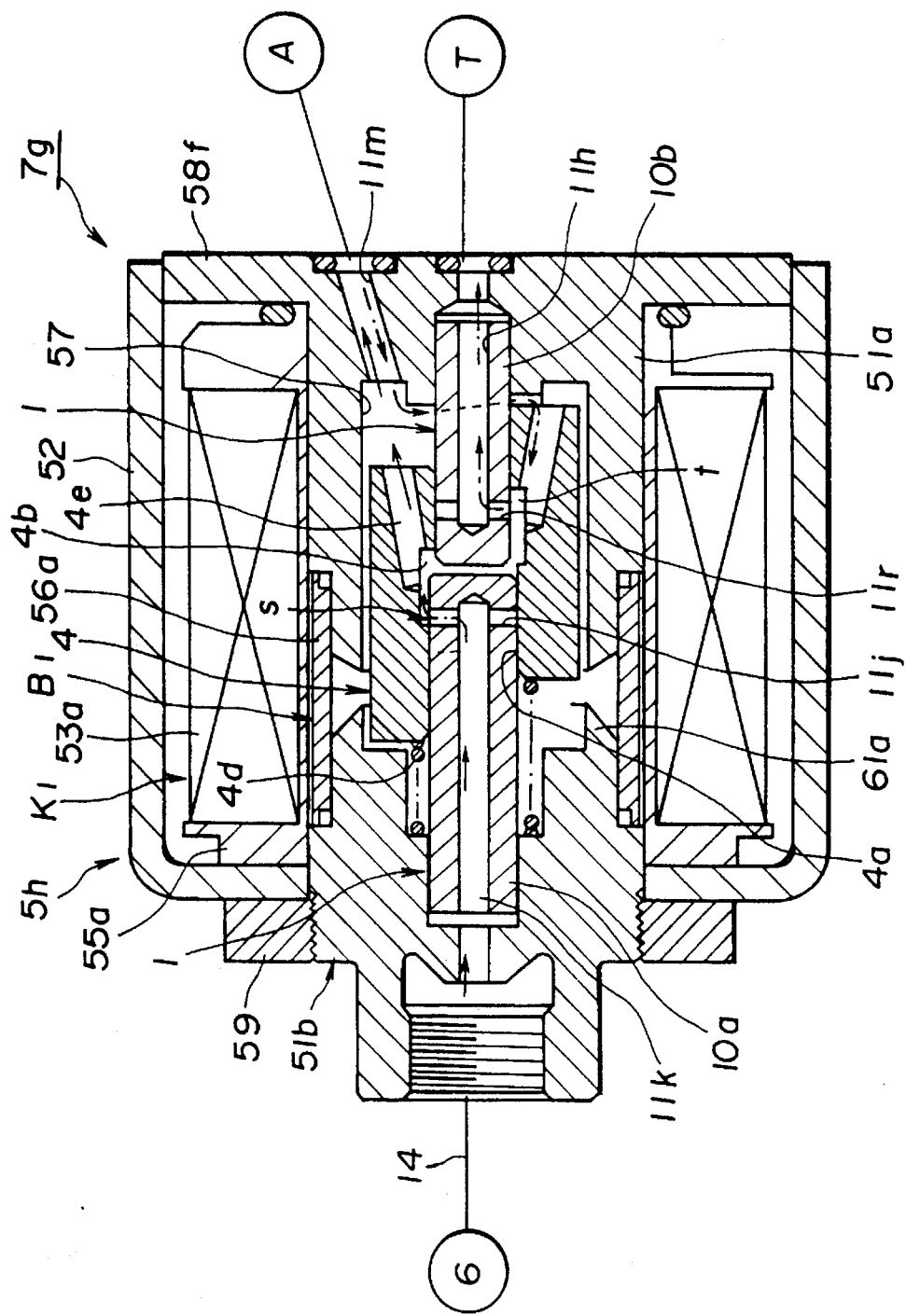
FIG. 13 is an enlarged longitudinal cross-sectional view illustrating a seventh embodiment of the pressure control valve, wherein upper and lower halves respectively showing one valve condition in the solenoid-activated state and the other valve condition in the solenoid-deactivated state.

Referring now to FIG. 13, the upper half of FIG. 13 shows the energized condition of the solenoid 5h employed in the pressure control valve 7g of the seventh embodiment, while the lower half of FIG. 13 shows the de-energized condition of the solenoid 5h. The structure of the pressure control valve 7g of the seventh embodiment is basically similar to the pressure control valve 7f of the sixth embodiment, and the solenoid plunger of the control valve 7g has the same structure as that of the control valve The valve 7g of the seventh embodiment is different from the valve 7f of the sixth embodiment in that the stepped valve member 1 is comprised of two split parallel-pin-like members, namely a large-diameter valve portion 10a and a small-diameter valve portion 10b. The large-diameter portion 10a is press-fitted into the axial bore defined in the left-hand side base 51b, while the small-diameter portion 10b is press-fitted into the axial bore defined in the right-hand side base 51a. There is no oil leakage between the outer peripheral surfaces of the pin-like members 10a and 10b and the inner walls of the axial bores defined in the two bases 51a mid 51b. Therefore, the control valve 7g of the seventh embodiment does not require a seal ring 69 fitted to the inner wall of the valve 7f of the sixth embodiment. Accordingly, the control valve 7g of the seventh embodiment has the same effect as the valve 7f of the sixth embodiment.

Eighth embodiment

Figure 14:
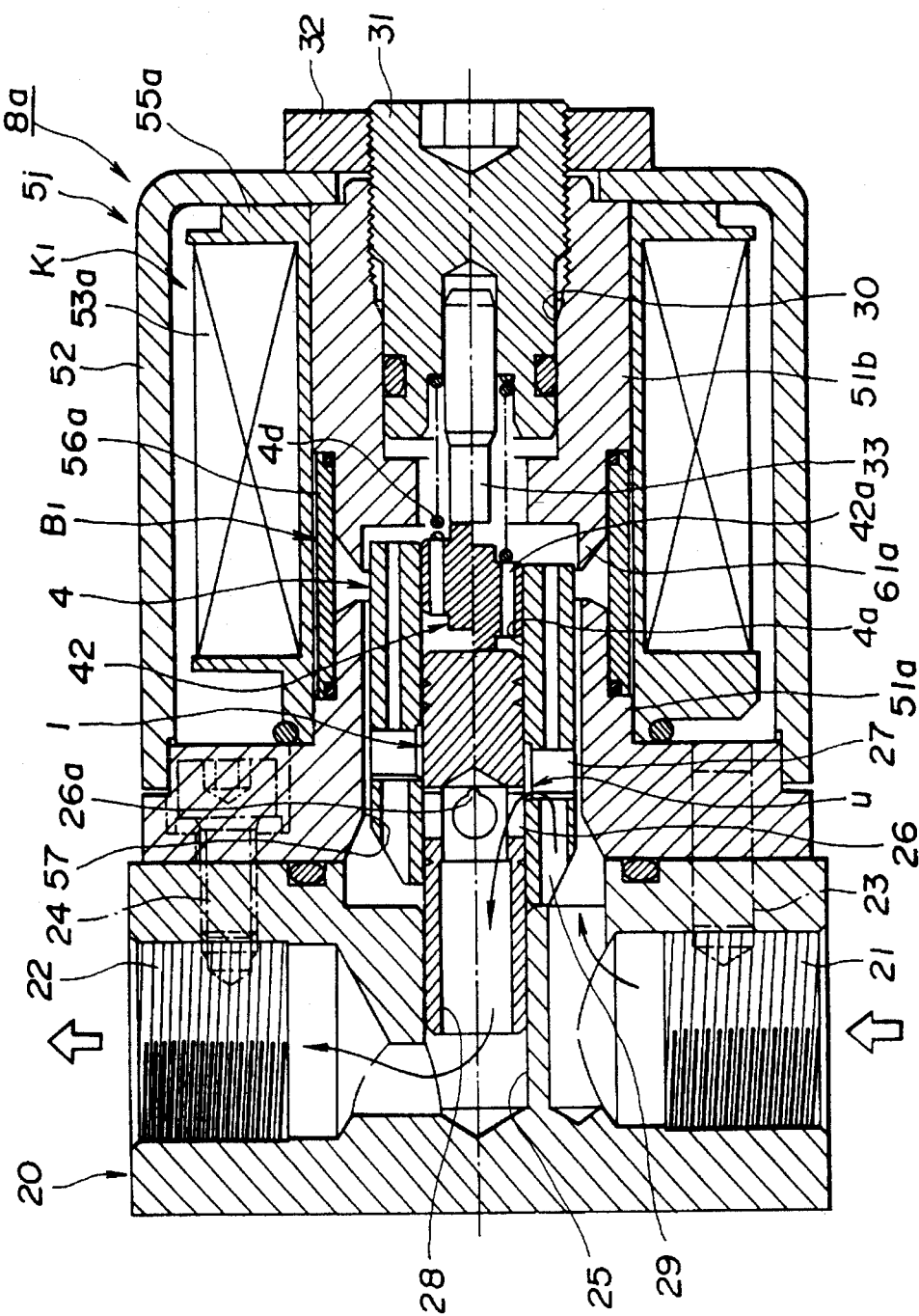
FIG. 14 is an enlarged longitudinal cross-sectional view illustrating an eighth embodiment of the pressure control valve, wherein upper and lower halves respectively showing one valve condition in the solenoid-activated state and the other valve condition in the solenoid-deactivated state.

Referring now to FIG. 14, the upper half of FIG. 14 shows the energized condition of the solenoid 5j employed in the pressure control valve 8a of the eighth embodiment, while the lower half of FIG. 14 shows the de-energized condition of the solenoid 5j. In the eighth embodiment, the control valve structure according to the invention is applied as a fluid flow control valve 8a of a steering effort control system, In the eighth embodiment, a main fluid flow regulating valve portion is defined on the radially opposing peripheral surfaces of the valve member 1 and the plunger 4. The flow control valve 8a includes a valve housing 20 which has two ports radially opposing to each other, namely a screw-threaded inlet port 21 and a screw-threaded outlet port 22. An electromagnetic solenoid 5j is attached to one side wall of the valve housing 20. The solenoid 5j is substantially similar to the solenoid 5d of the pressure control valve 7c of the third embodiment, except for the point described hereinbelow. The base 51a of the solenoid 5j is positioned with respect to the valve housing 20 by way of a positioning pin 23 such as a parallel pin and thereafter the solenoid base 51a is firmly secured onto the side wall of the housing 20 by bolts 24. In this manner, an axial bore 25 formed along the central axis of the housing 20 is axially aligned with the cylindrical plunger chamber 57 defined in the base 51a along the central axis thereof. One end of the stationary valve member 1 is press-fitted into the axial bore 25 of the housing, the other end is projected into the plunger chamber The solenoid plunger 4 is slidably received on the outer periphery of the projected portion of the stationary valve member 1. At least one radially extending through-opening-like oil supply port 26 is formed in the projected portion of the valve member 1. The plunger 4 includes a radially bored oil supply port 27, for feeding working fluid to the radial supply port 26 therethrough. The valve member 1 also includes an axially extending pressure supply communication bore 28 which intercommunicates the screw-threaded outlet port 22 and the radial supply port 26. The plunger 4 includes an axially extending communication passageway 29 intercommunicating the supply port 27 and the screw-threaded inlet port 21. With these arrangements, the radial supply port 26 of the stationary valve member 1 is cooperative with the supply port 27 of the plunger 4, to define a variable throttling orifice u which restricts and regulates a flow rate of working fluid flowing from the inlet port 21 to the outlet port 22. The radial supply port 26 has a substantially U-shaped radially extending tapered groove 26a at the rightmost end of the inner periphery, for allowing a throttling rate of the orifice u to gradually vary in accordance with an increase in rightward axial displacement of the plunger 4 to the valve member 1, and for avoiding excessive change in the throttling rate owing to the rightward movement of the plunger 4. The right-hand side base 51b includes a screw-threaded axial bore 30 into which a spring-bias adjusting screw 31 is screwed, for adjusting a spring set force of a return spring 4d. A fastening nut 32 is screwed onto the male-screw threaded portion of the adjusting screw 31 and whereby the adjusting screw 31 is completely locked to the base 51b and simultaneously the solenoid coil casing 52 is fixed on the base 51b. The base 51b also defines an axial bore at the left half. A stopper pin 33 is press-fitted into the axial bore of the base 51b, so that the maximum rightward axial movement of the plunger 4 is restricted by abutment between the left end of the stopper pin 33 and the right end of the stopper 42 press-fitted into the plunger 4. The flow control valve 8a of the eighth embodiment operates as follows.

Figure 15:
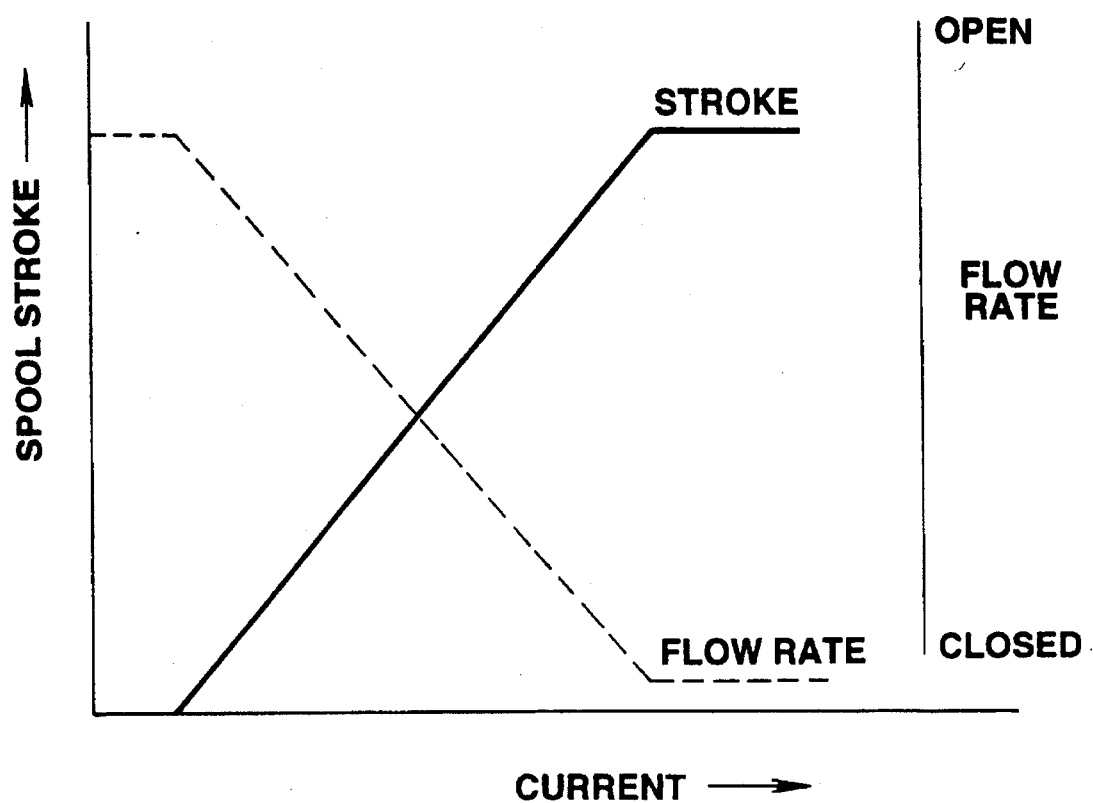
FIG. 15 is a graph illustrating fluid-flow throttling amount and stroke versus exciting-current characteristics in the pressure control valve of the eighth embodiment.

Under the de-energized condition of the solenoid 5j, the plunger 4 is biased to its leftmost position by the bias of the spring 4d, as seen in the lower half of FIG. 14. The throttling rate of the orifice u is set to a minimum value, that is, the flow rate through the orifice u is set to a maximum value at the leftmost plunger position wherein the stopper 42 abuts the right end of the valve member 1. Under the energized condition of the solenoid 5j as seen in the upper half of FIG. 14, the plunger 4 is moved rightwards by attraction of the solenoid 5j, with the result that the throttling rate of the orifice u is set to a maximum value, i.e., the flow rate through the orifice u is set to a minimum value at the rightmost plunger position wherein the stopper 42 abuts the stopper pin 33. As appreciated from the above, the plunger 4 is finally held in a balanced position in which the attracting force created by the solenoid 5j is balanced to the bias of the spring 4d. As shown in FIG. 15, the flow control valve 8a exhibits a plunger stroke versus solenoid exciting current characteristic and a flow rate versus solenoid exciting current characteristic. As appreciated from the characteristics illustrated in FIG. 15, the flow rate of the control valve 8a is varied in inverse proportion to a value of exciting current applied to the solenoid 5j. In the flow control valve 8a of the eighth embodiment, since the plunger 4 also serving as the spool valve and the stationary valve member 1 are coaxially arranged with each other, the entire axial length of the valve 8a can be shortened and consequently the number of parts constructing the valve unit is reduced. This ensures a lightweight fluid flow control valve unit.

Ninth embodiment

Figure 16:
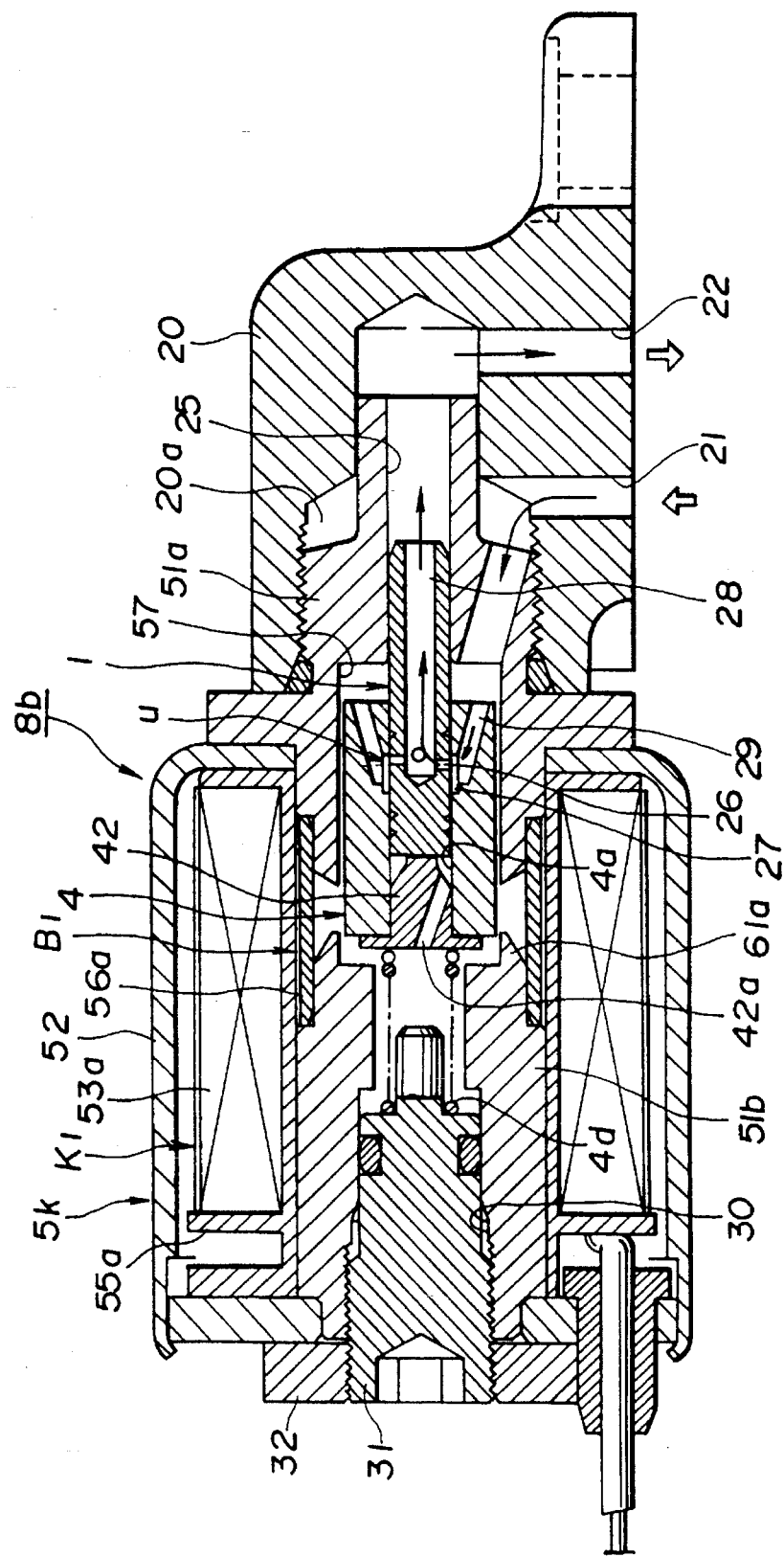
FIG. 16 is an enlarged longitudinal cross-sectional view illustrating a ninth embodiment of the pressure control valve in the solenoid-deactivated state.
Figure 17:
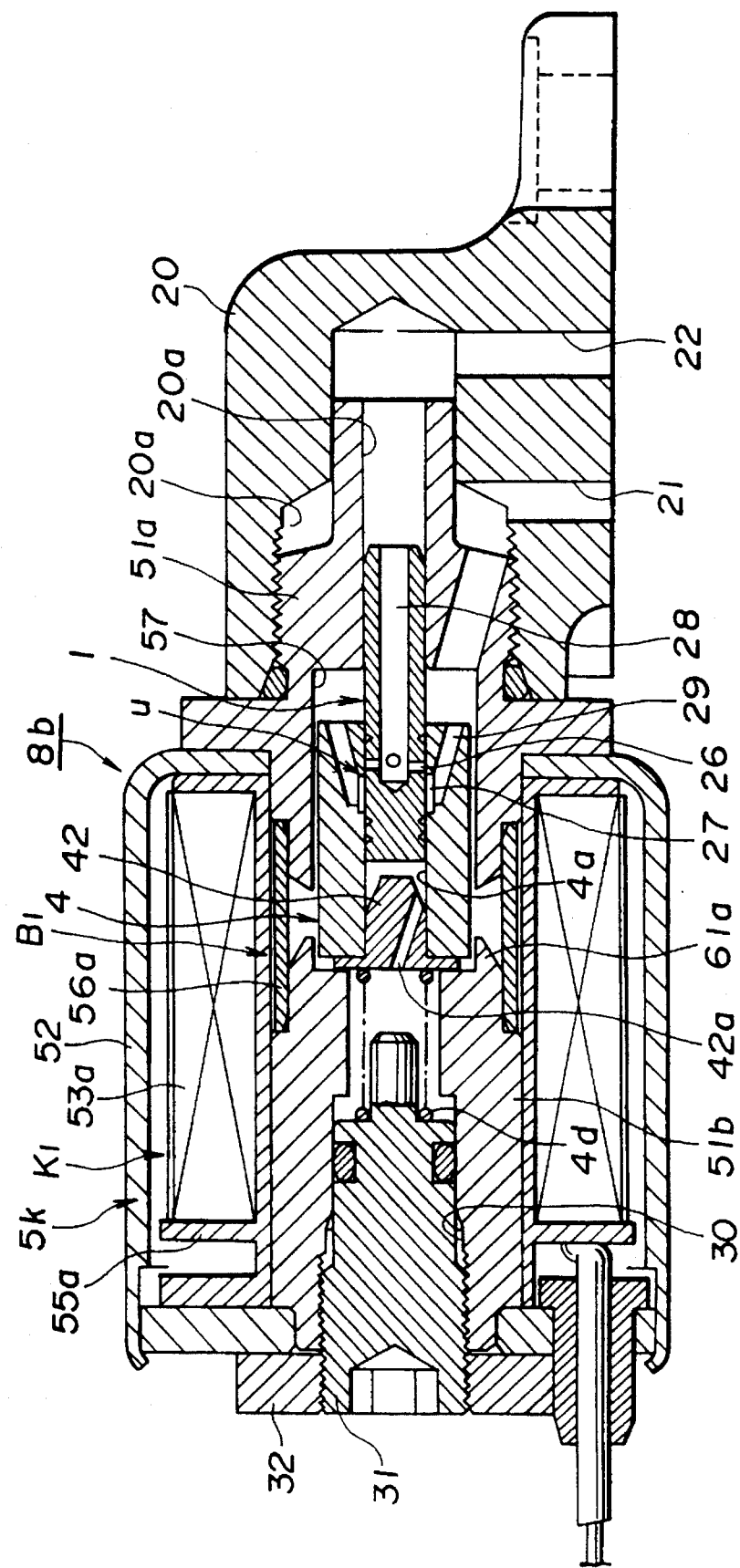
FIG. 17 is an enlarged cross-sectional view illustrating the pressure control valve of the ninth embodiment in the solenoid-activated state.

Referring now to FIGS. 16 and 17, there is shown a fluid flow control valve 8b of the ninth embodiment. FIG. 16 shows one valve state wherein the solenoid 5k is de-energized, while FIG. 17 shows the other valve state wherein the solenoid 5k is energized. The structure of the flow control valve 8b of the ninth embodiment is basically similar to that of the flow control valve 8a of the eighth embodiment, except for some points as detailed later. In the control valve 8b of the ninth embodiment, in addition to the plunger chamber 57, the base 51a is formed with the axial bore 25 as well as the plunger chamber 57, for rigidly tilting thereinto one end of the valve member 1. The base 51a is firmly secured and screwed into the female-screw threaded hole 20a defined in the valve housing 20. The radial oil supply port 26 of the valve member 1 consists of a plurality of radially extending through openings each having a relatively small diameter. Additionally, the plural through openings 26 are arranged to be offset from each other in the axial direction of the valve member 1, with the result that the throttling rate of the orifice u can be moderately varied in accordance with an axial displacement or stroke of the plunger 4. In addition to the effect obtained by the flow control valve of the eighth embodiment, the flow control valve 8b of the ninth embodiment can avoid misalignment between the axial bore 25 receiving the valve member 1 and the plunger chamber 57 slidably accommodating the solenoid plunger 4 serving as the valve spool, because the two bores 25 and 57 are coaxially formed in the identical member, namely the base 51a. In the previously-described second to ninth embodiments, the bases 51a and/or 51b serves as the valve housing of the control valve unit.

According to the structure of the control valve of each embodiment, since the shaft-like valve member 1 and the solenoid plunger 4 are coaxially aligned with each other, and the solenoid plunger itself serves as the valve spool, and the solenoid base serves as the valve housing, the entire axial length of the control valve is shortened and in addition the number of parts constructing the valve unit is reduced to a minimum, whereby the valve unit itself can be small-sized, while insuring a flow control performance or a pressure control performance of the valve unit.

In the previously-noted embodiments, although the valve spool 4 itself (plunger) is made of magnetic material, only the outer peripheral portion of the spool 4 or either one of right and left halves of the spool may be made of magnetic material.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A structure for a fluid pressure control valve fluidly disposed between an external fluid pressure source and a fluid-pressure operated actuator and between a fluid reservoir and said actuator, comprising:

a valve housing defining therein an axial bore;

a cylindrical stationary valve member press-fitted into said axial bore and having a stepped portion projected out of said axial bore;

a cylindrical solenoid plunger slidably coaxially arranged with said stationary valve member so that an inner peripheral surface of said plunger slidably engages an outer peripheral surface of the projected portion of said stationary valve member, said plunger including an annular groove being trapezoidal in cross-section on the inner peripheral surface thereof, said annular groove being cooperative with two radial bores formed at both sides of the stepped section of said stationary valve member to define first and second variable throttling orifices, said first orifice fluidly disposed between said external fluid pressure source and said actuator for providing a restricted high-pressure fluid flow to said actuator, and said second orifice fluidly disposed between said reservoir and said actuator for providing a restricted low-pressure fluid flow to said actuator, by varying throttling rates of said first and second orifices such that a throttling rate of one of said two orifices is increased when a throttling rate of the other orifice is decreased depending on an axial position of said plunger to said stationary valve member;

said annular groove including a circumferentially extending wall section and two axially opposing annular wall sections, said wall sections respectively receiving the regulated fluid pressure, said two opposing annular wall sections having two different pressure-receiving areas for moving said plunger in said pressure reduction direction by reaction created by the difference between the pressure-receiving areas;

a return spring for biasing said plunger in one axial direction; and an electromagnetic solenoid coaxially arranged on an outer periphery of said plunger, for axially sliding said plunger against the bias of said spring in the other axial direction by an axial displacement based on a value of exciting current applied to said solenoid.

* * * * *